(12) United States Patent
Huang et al.

(10) Patent No.: US 11,082,954 B2
(45) Date of Patent: Aug. 3, 2021

(54) METHOD AND APPARATUS FOR GENERATING DEVICE-TO-DEVICE SIDELINK HARQ-ACK IN A WIRELESS COMMUNICATION SYSTEM

(71) Applicant: ASUSTek Computer Inc., Taipei (TW)

(72) Inventors: Chun-Wei Huang, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/110,511

(22) Filed: Dec. 3, 2020

(65) Prior Publication Data

US 2021/0168762 A1 Jun. 3, 2021

Related U.S. Application Data

(60) Provisional application No. 62/942,915, filed on Dec. 3, 2019.

(51) Int. Cl.
| | |
|---|---|
| *H04W 4/00* | (2018.01) |
| *H04W 72/02* | (2009.01) |
| *H04L 1/18* | (2006.01) |
| *H04W 72/12* | (2009.01) |
| *H04B 7/0456* | (2017.01) |
| *H04W 72/04* | (2009.01) |
| *H04L 5/00* | (2006.01) |

(52) U.S. Cl.
CPC .......... *H04W 72/02* (2013.01); *H04B 7/0456* (2013.01); *H04L 1/1819* (2013.01); *H04L 5/0055* (2013.01); *H04W 72/0446* (2013.01); *H04W 72/1289* (2013.01)

(58) Field of Classification Search
CPC .... H04W 72/02; H04B 7/0456; H04L 1/1819; H04L 5/0055
See application file for complete search history.

(56) References Cited

U.S. PATENT DOCUMENTS

2020/0099479 A1* 3/2020 Park ................ H04L 1/1896
2020/0112400 A1* 4/2020 Lee ................ H04W 76/11
(Continued)

OTHER PUBLICATIONS

Corresponding European Patent Application No. 20201143 1.0, Extended European Search Report dated May 10, 2021.
(Continued)

*Primary Examiner* — Siren Wei
(74) *Attorney, Agent, or Firm* — Cooper Legal Group, LLC

(57) ABSTRACT

In an example, a UE receives, from a network, a configuration of a sidelink resource pool. Physical Sidelink Feedback Channel (PSFCH) resources of the sidelink resource pool are configured, periodically with a period of N slots, in slots of the sidelink resource pool. The UE receives, from the network, a configuration with a set of time offsets for determining an association set. The UE determines one or more slots. Each slot of the one or more slots is in the association set and contains a PSFCH resource of the sidelink resource pool. The UE generates a sidelink Hybrid Automatic Repeat Request acknowledgement (HARQ-ACK) codebook based upon one or more occasions associated with one or more PSFCH resources of the sidelink resource pool. The one or more occasions is determined or derived based upon the one or more slots and the period of N slots.

20 Claims, 11 Drawing Sheets

(56) References Cited

U.S. PATENT DOCUMENTS

2020/0266857 A1* 8/2020 Hwang ............... H04B 7/0417
2020/0374978 A1* 11/2020 Panteleev ......... H04W 72/0406

OTHER PUBLICATIONS

LG Electronics, "Discussion on NR sidelink resource allocation for Mode 1", 3GPP TSG RAN WG1 #99 Meeting, R1-1912587, Document for Discussion and decision, Agenda Item 7.2.4.2.1, pp. 1-18, Nov. 18-22, 2019, Reno, NV.

Vivo, "Discussion on mode 1 resource allocation mechanism", 3GPP TSG RAN WG1 Meeting #98bis, R1-1911419, for Discussion and Decision, Agenda Item 7.2.4.2.1, pp. 1-5, Oct. 14-20, 2019, Chongqing, China.

Fujitsu, "Discussion on mode 1 resource allocation for NR V2X", 3GPP TSG RAN WG1 #99, R1-1912078, Document Discussion/Decision, Agenda Item 7.2.4.2.1, pp. 1-6, Nov. 18-22, 2019, Reno, USA.

* cited by examiner

METHOD AND APPARATUS FOR GENERATING DEVICE-TO-DEVICE SIDELINK HARQ-ACK IN A WIRELESS COMMUNICATION SYSTEM

CROSS-REFERENCE TO RELATED APPLICATIONS

The present Application claims the benefit of U.S. Provisional Patent Application Ser. No. 62/942,915 filed on Dec. 3, 2019, the entire disclosure of which is incorporated herein in its entirety by reference.

FIELD

This disclosure generally relates to wireless communication networks, and more particularly, to a method and apparatus for generating device-to-device sidelink Hybrid Automatic Repeat Request acknowledgement (HARQ-ACK) in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example method of a first User Equipment (UE) for transmitting a sidelink Hybrid Automatic Repeat Request acknowledgement (HARQ-ACK) codebook to a network in a third slot, the first UE receives, from the network, a configuration of a sidelink resource pool in a carrier and/or a cell. Physical Sidelink Feedback Channel (PSFCH) resources of the sidelink resource pool are configured, periodically with a period of N slots, in slots of the sidelink resource pool. N is larger than 1. The first UE receives, from the network, a configuration with a set of time offsets for determining an association set. The association set comprises a set of slots of the sidelink resource pool. The set of slots is earlier than the third slot. The set of slots is determined based upon the set of time offsets. The first UE determines one or more first slots, wherein each slot of the one or more first slots is in the association set and each slot of the one or more first slots comprises PSFCH resources of the sidelink resource pool. The first UE generates the sidelink HARQ-ACK codebook based upon one or more first occasions. The one or more first occasions is determined or derived based upon the one or more first slots and the period of N slots.

In an example method of a first UE for transmitting a sidelink HARQ-ACK codebook to a network in a third slot, the first UE receives, from the network, a first configuration with a set of time offsets for determining an association set. The association set comprises a set of slots determined based upon the set of time offsets. The set of slots is earlier than the third slot. The first UE receives, from the network, a second configuration with a plurality of sidelink resource pools in a carrier and/or a cell. The plurality of sidelink resource pools comprises a first sidelink resource pool and a second sidelink resource pool. PSFCH resources of the first sidelink resource pool are configured, periodically with a period of N1 slots, in slots of the first sidelink resource pool. PSFCH resources of the second sidelink resource pool are configured, periodically with a period of N2 slots, in slots of the second sidelink resource pool. The first UE determines one or more first slots, wherein each slot of the one or more first slots is in the association set and each slot of the one or more first slots comprises PSFCH resources of the first sidelink resource pool. The first UE determines one or more second slots, wherein each slot of the one or more second slots is in the association set and each slot of the one or more second slots comprises PSFCH resources of the second sidelink resource pool. The first UE generates the sidelink HARQ-ACK codebook based upon one or more first occasions and one or more second occasions. The one or more first occasions is determined or derived based upon the one or more first slots and the period of N1 slots. The one or more second occasions is determined or derived based upon the one or more second slots and the period of N2 slots.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: 3GPP TS 36.213 V15.4.0 (2018-12), "E-UTRA; Physical layer procedures (Release 15)"; 3GPP TS 36.212 V15.4.0 (2018-12), "E-UTRA; Physical layer; Multiplexing and channel coding (Release 15)"; 3GPP TS 36.211 V15.4.0 (2018-12), "E-UTRA; Physical layer; Physical channels and modulation (Release 15)"; RP-182111, "Revised SID: Study on NR V2X", LG Electronics; R1-1810051, Final Report of 3GPP TSG RAN WG1 #94 v1.0.0 (Gothenburg, Sweden, 20-24 Aug. 2018); R1-1812101, Final Report of 3GPP TSG RAN WG1 #94bis v1.0.0 (Chengdu, China, 8-12 Oct. 2018); R1-1901482, Final Report of 3GPP TSG RAN WG1 #95 v0.1.0 (Spokane, USA, 12-16 Nov. 2018); R1-1901483, Final Report of 3GPP TSG RAN WG1 #AH_1901 v1.0.0 (Taipei, Taiwan, 21-25 Jan. 2019); R1-1905837, Final Report of 3GPP TSG RAN WG1 #96 v2.0.0 (Athens, Greece, 25 Feb.-1 Mar. 2019); R1-1905921, Final Report of 3GPP TSG RAN WG1 #96bis v1.0.0 (Xi'an, China, 8-12 Apr. 2019); Draft Report of 3GPP TSG RAN WG1 #97 v0.1.0 (Reno, USA, 13-17 May 2019); 3GPP TS 38.213 V15.6.0 (2019-06), "NR; Physical layer procedures for control(Release 15)"; Draft Report of 3GPP TSG RAN WG1 #98 v0.1.0 (Prague, Czech, 26-30 Aug. 2019); Draft Report of 3GPP TSG RAN WG1 #98bis v0.1.0 (Chongqing, China, 14-20 Oct. 2019); Draft Report of 3GPP TSG RAN WG1 #99 v0.1.0 (Reno, USA, 18-22 Nov. 2019). The standards and documents listed above are hereby expressly incorporated by reference in their entirety.

Figure 1:
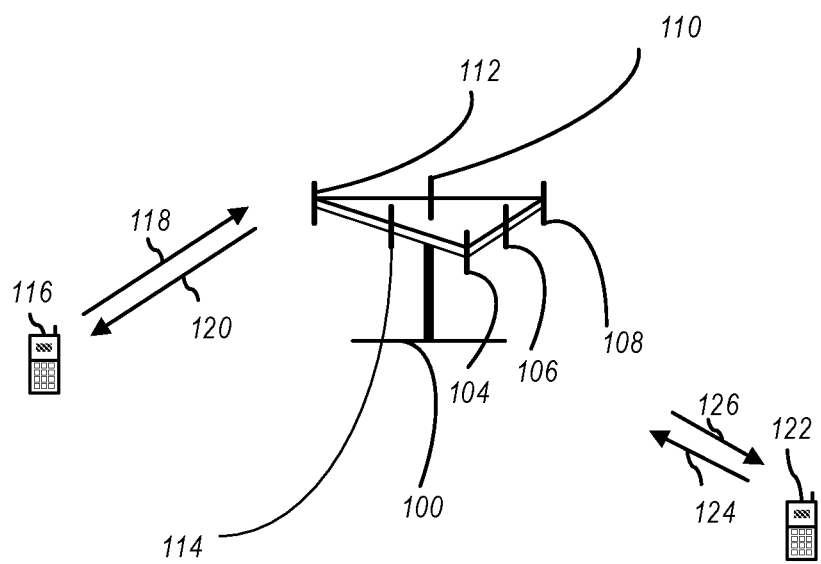
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
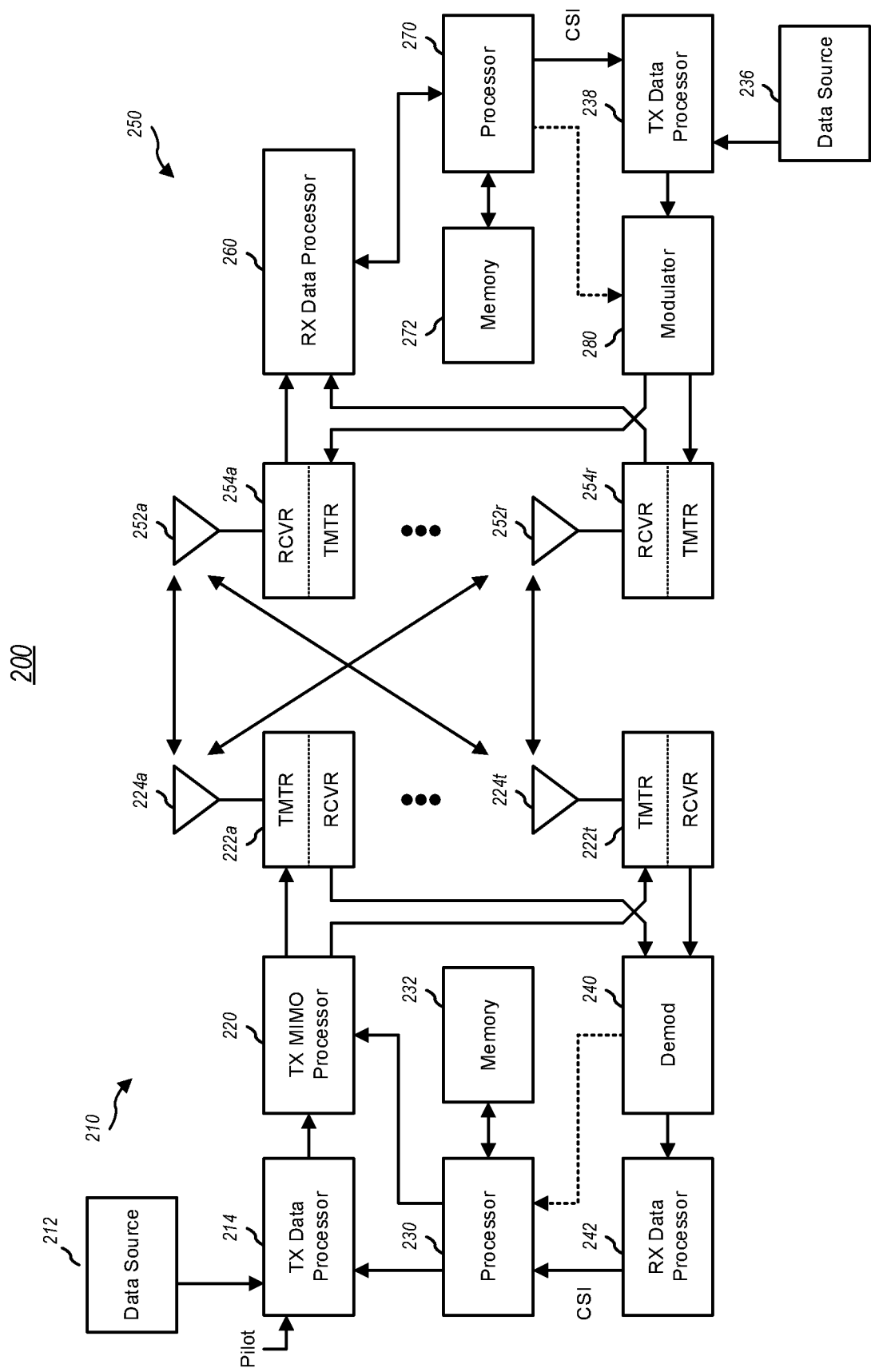
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
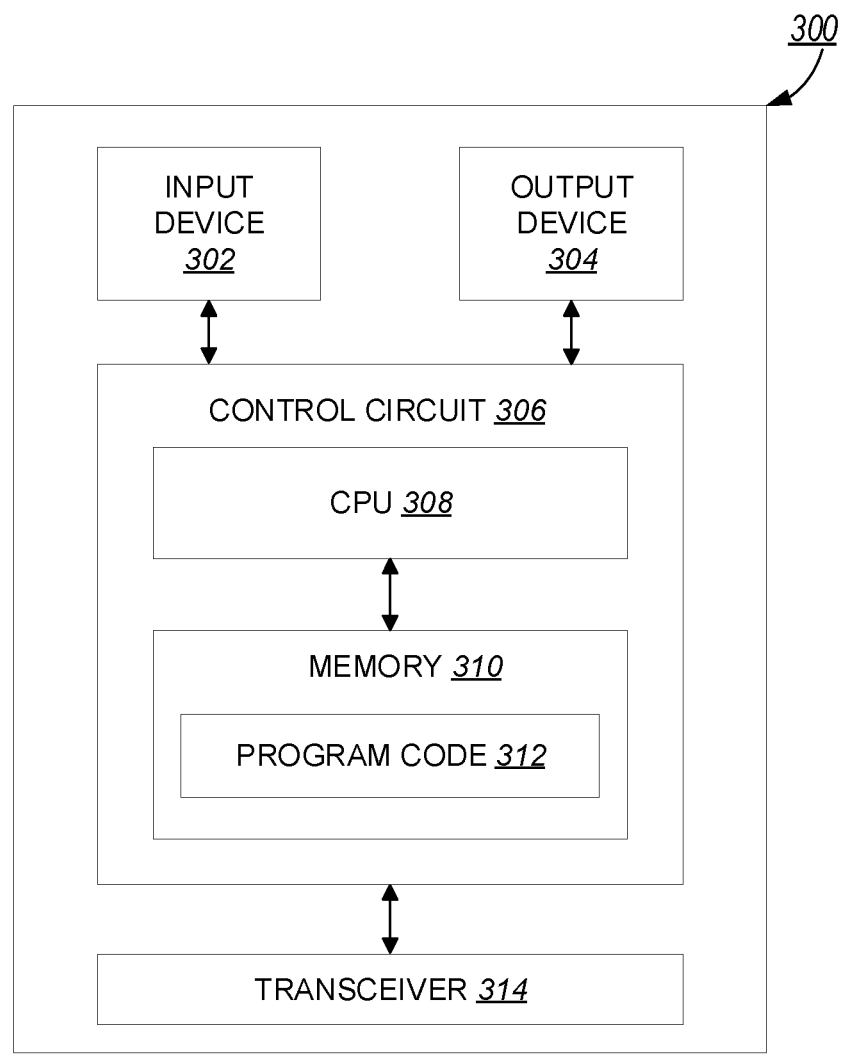
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
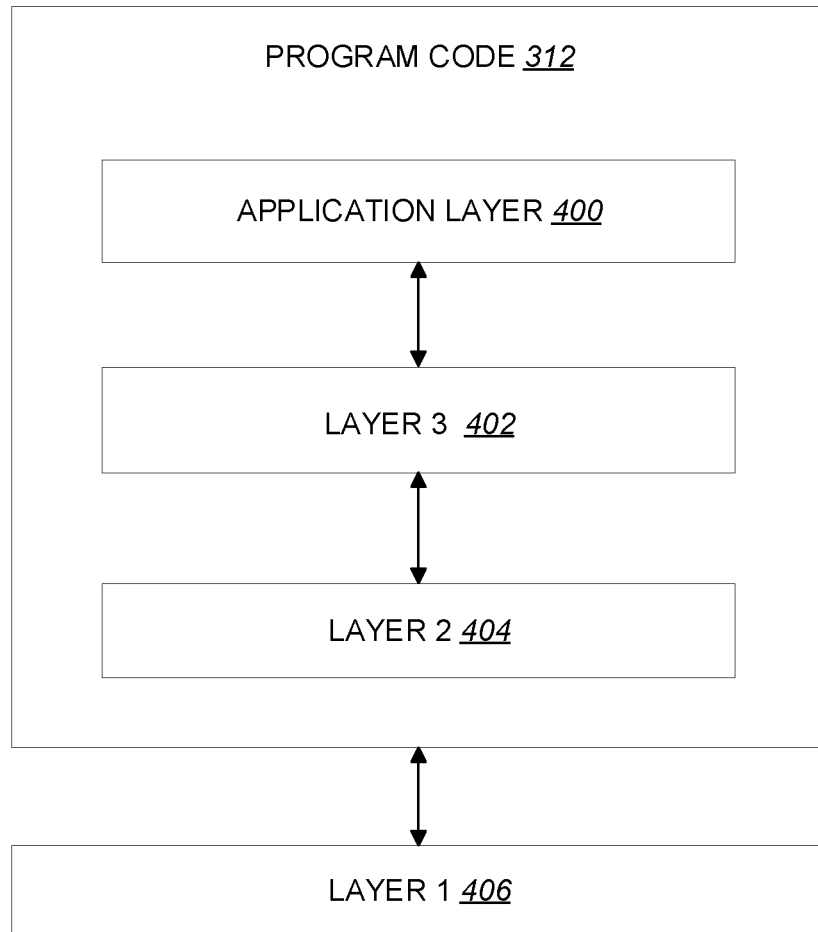
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

3GPP TS 36.213 V15.4.0 (2018-12) specifies the UE procedure for Vehicle-to-Everything (V2X) transmission in LTE/LTE-A. The V2X transmissions are performed as sidelink transmission mode 3 or sidelink transmission mode 4. Parts of 3GPP TS 36.213 V15.4.0 (2018-12) are quoted below:

14 UE Procedures Related to Sidelink

A UE can be configured by higher layers with one or more PSSCH resource configuration(s). A PSSCH resource configuration can be for reception of PSSCH, or for transmission of PSSCH. The physical sidelink shared channel related procedures are described in Subclause 14.1.

A UE can be configured by higher layers with one or more PSCCH resource configuration(s). A PSCCH resource configuration can be for reception of PSCCH, or for transmission of PSCCH and the PSCCH resource configuration is associated with either sidelink transmission mode 1, 2, 3 or sidelink transmission mode 4. The physical sidelink control channel related procedures are described in Subclause 14.2.

[ . . . ]

14.1 Physical Sidelink Shared Channel Related Procedures 14.1.1 UE Procedure for Transmitting the PSSCH

[ . . . ]

If the UE transmits SCI format 1 on PSCCH according to a PSCCH resource configuration in subframe n, then for the corresponding PSSCH transmissions of one TB for sidelink transmission mode 3, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4A.

for sidelink transmission mode 4, the set of subframes and the set of resource blocks are determined using the subframe pool indicated by the PSSCH resource configuration (described in Subclause 14.1.5) and using "Retransmission index and Time gap between initial transmission and retransmission" field and "Frequency resource location of the initial transmission and retransmission" field in the SCI format 1 as described in Subclause 14.1.1.4B.

14.1.1.6 U E Procedure for Determining the Subset of Resources to be Reported to Higher Layers in PSSCH Resource Selection in Sidelink Transmission Mode 4 and in Sensing Measurement in Sidelink Transmission Mode 3

In sidelink transmission mode 4, when requested by higher layers in subframe n for a carrier, the UE shall determine the set of resources to be reported to higher layers for PSSCH transmission according to the steps described in this Subclause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Subclause 14.1.1.4B.

In sidelink transmission mode 3, when requested by higher layers in subframe n for a carrier, the UE shall determine the set of resources to be reported to higher layers in sensing measurement according to the steps described in this Subclause. Parameters $L_{subCH}$, $P_{rsvp\_TX}$ and $prio_{TX}$ are all provided by higher layers (described in [11]). $C_{resel}$ is determined by $C_{resel}=10*$SL_RESOURCE_RESELE-CTION_COUNTER, where SL_RESOURCE_RESELECTION_COUNTER is provided by higher layers [11].

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall assume that any set of $L_{subCH}$ contiguous sub-channels included in the corresponding PSSCH resource pool (described in 14.1.5) within the time interval [n+$T_1$, n+$T_2$] corresponds to one candidate single-subframe resource, where selections of $T_1$ and $T_2$ are up to UE implementations under $T_1 \leq 4$ and $T_{2min}(prio_{TX}) \leq T_2 \leq 100$, if $T_{2min}(prio_{TX})$ is provided by higher layers for $prio_{TX}$, otherwise $20 \leq T_2 \leq 100$. UE selection of $T_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, ..., $t_{n'-1}^{SL}$ except for those in which its transmissions occur, where $t_{n'}^{SL}$=n if subframe n belongs to the set ($t_0^{SL}, t_1^{SL}, \ldots, t_{T_{max}}^{SL}$), otherwise subframe $t_{n'}^{SL}$ is the first subframe after subframe n belonging to the set ($t_0^{SL}, t_1^{SL}, \ldots, t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=a*8+b+1.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
  the UE has not monitored subframe $t_z^{SL}$ in Step 2.
  there is an integer j which meets $y+j \times P'_{rsvp\_TX}=z+P_{step} \times k \times q$ where j=0, 1, ..., $C_{resel}$−1, $P'_{rsvp\_TX}=P_{step} \times P_{rsvp\_TX}/100$, k is any value allowed by the higher layer parameter restrictResourceReservationPeriod and q=1, 2, ..., Q. Here, $$Q = \frac{1}{k} \text{ if } k < 1$$

and n'−z≤$P_{step} \times k$, where $t_{n'}^{SL}$=n if subframe n belongs to the set $t_0^{SL}, t_1^{SL}, \ldots, t_{T_{max}}^{SL}$, otherwise subframe $t_{n'}^{SL}$ is the first subframe belonging to the set $t_0^{SL}, t_1^{SL}, \ldots, t_{T_{max}}^{SL}$ after subframe n; and Q=1 otherwise.

6) The UE shall exclude any candidate single-subframe resource $R_{x,y}$ from the set $S_A$ if it meets all the following conditions:
  the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Subclause 14.2.1.
  PSSCH-RSRP measurement according to the received SCI format 1 is higher than $Th_{prio_{TX}prio_{RX}}$.
  the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $R_{x,y+j \times P_{rsvp\_TX}}$ for q=1, 2, ..., Q and j=0, 1, ..., $$C_{resel} - 1. \text{ Here, } Q = \frac{1}{P_{rsvp\_Rx}} \text{ if } P_{rsvp\_RX} < 1$$

and n'−m≤$P_{step} \times P_{rsvp\_RX}$, where $t_{n'}^{SL}$=n if subframe n belongs to the set ($t_0^{SL}, t_1^{SL}, \ldots, t_{T_{max}}^{SL}$), otherwise subframe $t_{n'}^{SL}$ is the first subframe after subframe n belonging to the set ($t_0^{SL}, t_1^{SL}, \ldots, t_{T_{max}}^{SL}$); otherwise Q=1.

7) If the number of candidate single-subframe resources remaining in the set $S_A$ is smaller than $0.2 \cdot M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub channels x+k for k=0, ..., $L_{subCH}$−1 in the monitored subframes in Step 2 that can be expressed by $t_{y-P_{step}*j}^{SL}$ for a non-negative integer j if $P_{rsvp\_TX} \geq 100$, and $t_{y-P'_{rsvp\_TX}*j}^{SL}$ for a non-negative integer j otherwise.

9) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

[ ... ]

14.2 Physical Sidelink Control Channel Related Procedures

For sidelink transmission mode 3, if a UE is configured by higher layers to receive DCI format 5A with the CRC scrambled by the SL-V-RNTI or SL-SPS-V-RNTI, the UE shall decode the PDCCH/EPDCCH according to the combination defined in Table 14.2-2. A UE is not expected to receive DCI format 5A with size larger than DCI format 0 in the same search space that DCI format 0 is defined on.

TABLE 14.2-2

| PDCCH/EPDCCH configured by SL-V-RNTI or SL-SPS-V-RNTI | |
| --- | --- |
| DCI format | Search Space |
| DCI format 5A | For PDCCH: Common and UE specific by C-RNTI  For EPDCCH: UE specific by C-RNTI |

The carrier indicator field value in DCI format 5A corresponds to v2x-InterFreqInfo.

14.2.1 UE Procedure for Transmitting the PSCCH

[ ... ]

For sidelink transmission mode 3,
  The UE shall determine the subframes and resource blocks for transmitting SCI format 1 as follows:
    SCI format 1 is transmitted in two physical resource blocks per slot in each subframe where the corresponding PSSCH is transmitted.

If the UE receives in subframe n DCI format 5A with the CRC scrambled by the SL-V-RNTI, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].
  If "Time gap between initial transmission and retransmission" in the configured sidelink grant (described in [8]) is not equal to zero, another transmission of PSCCH is in the PSCCH resource $L_{Re\ TX}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{Re\ TX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

If the UE receives in subframe n DCI format 5A with the CRC scrambled by the SL-SPS-V-RNTI, the UE shall consider the received DCI information as a valid sidelink semi-persistent activation or release only for the SPS configuration indicated by the SL SPS configuration index field. If the received DCI activates an SL SPS configuration, one transmission of PSCCH is in the PSCCH resource $L_{Init}$ (described in Subclause 14.2.4) in the first subframe that is included in $(t_0^{SL}, t_1^{SL}, t_2^{SL}, \ldots)$ and that starts not earlier than $$T_{DL} - \frac{N_{TA}}{2} \times T_S + (4+m) \times 10^{-3}.$$

$L_{Init}$ is the value indicated by "Lowest index of the sub-channel allocation to the initial transmission" associated with the configured sidelink grant (described in [8]), $(t_0^{SL}, t_1^{SL}, t_2^{SL}, \ldots)$ is determined by Subclause 14.1.5, the value m is indicated by 'SL index' field in the corresponding DCI format 5A according to Table 14.2.1-1 if this field is present and m=0 otherwise, $T_{DL}$ is the start of the downlink subframe carrying the DCI, and $N_{TA}$ and $T_S$ are described in [3].
  If "Time gap between initial transmission and retransmission" in the configured sidelink grant (described in [8]) is not equal to zero, another transmission of PSCCH is in the PSCCH resource $L_{ReTx}$ in subframe $t_{q+SF_{gap}}^{SL}$, where $SF_{gap}$ is the value indicated by "Time gap between initial transmission and retransmission" field in the configured sidelink grant, subframe $t_q^{SL}$ corresponds to the subframe $n+k_{init} \cdot L_{ReTX}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.

The UE shall set the contents of the SCI format 1 as follows:
  the UE shall set the Modulation and coding scheme as indicated by higher layers.
  the UE shall set the "Priority" field according to the highest priority among those priority(s) indicated by higher layers corresponding to the transport block.
  the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.
  the UE shall set the Resource reservation according to table 14.2.1-2 based on indicated value X, where X is equal to the Resource reservation interval provided by higher layers divided by 100.
  Each transmission of SCI format 1 is transmitted in one subframe and two physical resource blocks per slot of the subframe.
The UE shall randomly select the cyclic shift $n_{cs,\lambda}$, among $\{0, 3, 6, 9\}$ in each PSCCH transmission.
For sidelink transmission mode 4,
  The UE shall determine the subframes and resource blocks for transmitting SCI format 1 as follows:
    SCI format 1 is transmitted in two physical resource blocks per slot in each subframe where the corresponding PSSCH is transmitted.
    If the configured sidelink grant from higher layer indicates the PSCCH resource in subframe $t_n^{SL}$, one transmission of PSCCH is in the indicated PSCCH resource m (described in Subclause 14.2.4) in subframe $t_n^{SL}$.
    If "Time gap between initial transmission and retransmission" in the configured sidelink grant (described in [8]) is not equal to zero, another transmission of PSCCH is in the PSCCH resource $L_{ReTX}$ in subframe $t_{n+SF_{gap}}^{SL}$ where $SF_{gap}$ is the value indicated by "Time gap between initial transmission and retransmission" field in the configured sidelink grant, $L_{ReTx}$ corresponds to the value $n_{subCH}^{start}$ determined by the procedure in Subclause 14.1.1.4C with the RIV set to the value indicated by "Frequency resource location of the initial transmission and retransmission" field in the configured sidelink grant.
  the UE shall set the contents of the SCI format 1 as follows:
    the UE shall set the Modulation and coding scheme as indicated by higher layers.
    the UE shall set the "Priority" field according to the highest priority among those priority(s) indicated by higher layers corresponding to the transport block.
    the UE shall set the Time gap between initial transmission and retransmission field, the Frequency resource location of the initial transmission and retransmission field, and the Retransmission index field such that the set of time and frequency resources determined for PSSCH according to Subclause 14.1.1.4C is in accordance with the PSSCH resource allocation indicated by the configured sidelink grant.

the UE shall set the Resource reservation field according to table 14.2.1-2 based on indicated value X, where X is equal to the Resource reservation interval provided by higher layers divided by 100.

Each transmission of SCI format 1 is transmitted in one subframe and two physical resource blocks per slot of the subframe.

The UE shall randomly select the cyclic shift $n_{es,\lambda}$, among $\{0, 3, 6, 9\}$ in each PSCCH transmission.

TABLE 14.2.1-1

Mapping of DCI format 5A offset field to indicated value m

| SL index field in DCI format 5A | Indicated value m |
|---|---|
| '00' | 0 |
| '01' | 1 |
| '10' | 2 |
| '11' | 3 |

TABLE 14.2.1-2

Determination of the Resource reservation field in SCI format 1

| Resource reservation field in SCI format 1 | Indicated value X | Condition |
|---|---|---|
| '0001', '0010', . . . , '1010' | Decimal equivalent of the field | The higher layer decides to keep the resource for the transmission of the next transport block and the value X meets $1 \leq X \leq 10$. |
| '1011' | 0.5 | The higher layer decides to keep the resource for the transmission of the next transport block and the value X is 0.5. |
| '1100' | 0.2 | The higher layer decides to keep the resource for the transmission of the next transport block and the value X is 0.2. |
| '0000' | 0 | The higher layer decides not to keep the resource for the transmission of the next transport block. |
| '1101', '1110', '1111' | | Reserved |

14.2.2 UE Procedure for Receiving the PSCCH

For each PSCCH resource configuration associated with sidelink transmission mode 3, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

For each PSCCH resource configuration associated with sidelink transmission mode 4, a UE configured by higher layers to detect SCI format 1 on PSCCH shall attempt to decode the PSCCH according to the PSCCH resource configuration. The UE is not required to decode more than one PSCCH at each PSCCH resource candidate. The UE shall not assume any value for the "Reserved bits" before decoding a SCI format 1.

3GPP TS 36.212 V15.4.0 (2018-12) specifies Cyclic Redundancy Check (CRC) attachment for downlink shared channel and downlink control information in LTE/LTE-A. The downlink shared channel and downlink control information are for communication between network node and UE, i.e. Uu link. The sidelink shared channel and sidelink control information are for communication between UEs, i.e., PC5 link or sidelink. Parts of 3GPP TS 36.212 V15.4.0 (2018-12) are quoted below:

5.3.3.1.9A Format 5A

DCI format 5A is used for the scheduling of PSCCH, and also contains several SCI format 1 fields used for the scheduling of PSSCH.

The following information is transmitted by means of the DCI format 5A:

Carrier indicator—3 bits. This field is present according to the definitions in [3].

Lowest index of the subchannel allocation to the initial transmission—$\lceil \log_2 (N_{subchannel}^{SL}) \rceil$ bits as defined in subclause 14.1.1.4C of [3].

SCI format 1 fields according to 5.4.3.1.2:

Frequency resource location of initial transmission and retransmission.

Time gap between initial transmission and retransmission.

SL index—2 bits as defined in subclause 14.2.1 of [3] (this field is present only for cases with TDD operation with uplink-downlink configuration 0-6).

When the format 5A CRC is scrambled with SL-SPS-V-RNTI, the following fields are present:

SL SPS configuration index—3 bits as defined in subclause 14.2.1 of [3].

Activation/release indication—1 bit as defined in subclause 14.2.1 of [3].

If the number of information bits in format 5A mapped onto a given search space is less than the payload size of format 0 mapped onto the same search space, zeros shall be appended to format 5A until the payload size equals that of format 0 including any padding bits appended to format 0.

If the format 5A CRC is scrambled by SL-V-RNTI and if the number of information bits in format 5A mapped onto a given search space is less than the payload size of format 5A with CRC scrambled by SL-SPS-V-RNTI mapped onto the same search space and format 0 is not defined on the same search space, zeros shall be appended to format 5A until the payload size equals that of format 5A with CRC scrambled by SL-SPS-V-RNTI.

5.4.3.1 SCI Formats
The fields defined in the SCI formats below are mapped to the information bits $a_0$ to $a_{A-1}$ as follows.
Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

5.4.3.1.2 SCI Format 1
SCI format 1 is used for the scheduling of PSSCH.
The following information is transmitted by means of the SCI format 1:
  Priority—3 bits as defined in subclause 4.4.5.1 of [7].
  Resource reservation—4 bits as defined in subclause 14.2.1 of [3].
  Frequency resource location of initial transmission and retransmission—$\lceil \log_2(N_{subchannel}^{SL}(N_{subchannel}^{SL}+1)/2) \rceil$ bits as defined in subclause 14.1.1.4C of [3].
  Time gap between initial transmission and retransmission—4 bits as defined in subclause 14.1.1.4C of [3].
  Modulation and coding scheme—5 bits as defined in subclause 14.2.1 of [3].
  Retransmission index—1 bit as defined in subclause 14.2.1 of [3].
  Transmission format—1 bit, where value 1 indicates a transmission format including rate-matching and TBS scaling, and value 0 indicates a transmission format including puncturing and no TBS-scaling. This field is only present if the transport mechanism selected by higher layers indicates the support of rate matching and TBS scaling.
  Reserved information bits are added until the size of SCI format 1 is equal to 32 bits. The reserved bits are set to zero.

3GPP TS 36.211 V15.4.0 (2018-12) specifies generation for physical sidelink shared channel and physical sidelink control channel in LTE/LTE-A. The physical sidelink shared channel and physical sidelink control channel are for communication between devices, i.e., PC5 link or device-to-device link.

The physical sidelink shared channel (PSSCH) delivers data/transport block for sidelink shared channel (SL-SCH).

The physical sidelink control channel (PSCCH) delivers sidelink control information (SCI).

Parts of 3GPP TS 36.211 V15.4.0 (2018-12) are quoted below:
9 Sidelink
9.1 Overview
A sidelink is used for ProSe direct communication and ProSe direct discovery between UEs.
9.1.1 Physical Channels
A sidelink physical channel corresponds to a set of resource elements carrying information originating from higher layers and is the interface defined between 3GPP TS 36.212 [3] and the present document 3GPP TS 36.211. The following sidelink physical channels are defined:
  Physical Sidelink Shared Channel, PSSCH
  Physical Sidelink Control Channel, PSCCH
  [ . . . ]
RP-182111 specifies the Justification and objective of study item on NR V2X. Parts of RP-182111 are quoted below:
SA1 has identified 25 use cases for advanced V2X services and they are categorized into four use case groups: vehicles platooning, extended sensors, advanced driving and remote driving. The detailed description of each use case group is provided as below.
  Vehicles Platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
  Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.
  Advanced Driving enables semi-automated or full-automated driving. Each vehicle and/or RSU shares its own perception data obtained from its local sensors with vehicles in proximity and that allows vehicles to synchronize and coordinate their trajectories or manoeuvres. Each vehicle shares its driving intention with vehicles in proximity too.
  Remote Driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

In RAN1 #94 meeting, RAN1 has some agreements about NR V2X, at least some of which are quoted below from R1-1810051:
Agreements:
  At least PSCCH and PSSCH are defined for NR V2X.
    PSCCH at least carries information necessary to decode PSSCH.
    Note: PSBCH will be discussed in the synchronization agenda.
  RAN1 continues study on the necessity of other channels.
  Further study on
    Whether/which sidelink feedback information is carried by PSCCH or by another channel/signal.
    Whether/which information to assist resource allocation and/or schedule UE's transmission resource(s) is carried by PSCCH or by another channel/signal.
    PSCCH format(s) and content(s) for unicast, groupcast, and broadcast
[ . . . ]
Agreements:
RAN1 to continue study on multiplexing physical channels considering at least the above aspects:
  Multiplexing of PSCCH and the associated PSSCH (here, the "associated" means that the PSCCH at least carries information necessary to decode the PSSCH).
    Study further the following options:
      Option 1: PSCCH and the associated PSSCH are transmitted using non-overlapping time resources.
        Option 1A: The frequency resources used by the two channels are the same.
        Option 1B: The frequency resources used by the two channels can be different.
      Option 2: PSCCH and the associated PSSCH are transmitted using non-overlapping frequency resources in the all the time resources used for transmission. The time resources used by the two channels are the same.

Option 3: A part of PSCCH and the associated PSSCH are transmitted using overlapping time resources in non-overlapping frequency resources, but another part of the associated PSSCH and/or another part of the PSCCH are transmitted using non-overlapping time resources.

[ . . . ]

Agreements:
At least two sidelink resource allocation modes are defined for NR-V2X sidelink communication
Mode 1: Base station schedules sidelink resource(s) to be used by UE for sidelink transmission(s)
Mode 2: UE determines (i.e. base station does not schedule) sidelink transmission resource(s) within sidelink resources configured by base station/network or pre-configured sidelink resources In RAN1 #94bis meeting, RAN1 has some agreements about NR V2X, at least some of which are quoted below from R1-1812101:

Agreements:
Layer-1 destination ID is conveyed via PSCCH.
Additional Layer-1 ID(s) is conveyed via PSCCH at least for the purpose of identifying which transmissions can be combined in reception when HARQ feedback is in use.

Agreements:
For unicast, sidelink HARQ feedback and HARQ combining in the physical layer are supported.
For groupcast, sidelink HARQ feedback and HARQ combining in the physical layer are supported.

Agreements:
For PSCCH and associated PSSCH multiplexing
At least one of Option 1A, 1B, and 3 is supported.

Agreements:
Sidelink control information (SCI) is defined.
SCI is transmitted in PSCCH.
SCI includes at least one SCI format which includes the information necessary to decode the corresponding PSSCH.
NDI, if defined, is a part of SCI.
Sidelink feedback control information (SFCI) is defined.
SFCI includes at least one SFCI format which includes HARQ-ACK for the corresponding PSSCH.
FFS whether a solution will use only one of "ACK," "NACK," "DTX," or use a combination of them.

Agreements:
At least resource pool is supported for NR sidelink
Resource pool is a set of time and frequency resources that can be used for sidelink transmission and/or reception.
A resource pool is inside the RF bandwidth of the UE.
UE assumes a single numerology in using a resource pool.
Multiple resource pools can be configured to a single UE in a given carrier.
FFS how to use multiple resource pools when (pre-)configured.
FFS BWP is supported for NR sidelink
It is RAN1 understanding that, in some cases, the entire system bandwidth is covered by a single BWP.
There is at most one activated sidelink BWP for a UE in a given carrier as in the Uu case
Further study the feasibility, benefit, and impact of sidelink BWP switching Aim to conclude in RAN1 #95
Companies are encouraged to provide more analysis, including checking current Rel-15 specification regarding BWP related text In RAN1 #95 meeting, RAN1 has some agreements about NR V2X, at least some of which are quoted below from R1-1901482:

Working assumption:
Regarding PSCCH/PSSCH multiplexing, at least option 3 is supported for CP-OFDM.
RAN1 assumes that transient period is not needed between symbols containing PSCCH and symbols not containing PSCCH in the supported design of option 3.

Agreements:
Physical sidelink feedback channel (PSFCH) is defined and it is supported to convey SFCI for unicast and groupcast via PSFCH.

Agreements:
When SL HARQ feedback is enabled for unicast, the following operation is supported for the non-CBG case:
Receiver UE generates HARQ-ACK if it successfully decodes the corresponding TB. It generates HARQ-NACK if it does not successfully decode the corresponding TB after decoding the associated PSCCH which targets the receiver UE.

Agreements:
When SL HARQ feedback is enabled for groupcast, the following operations are further studied for the non-CBG case:
Option 1: Receiver UE transmits HARQ-NACK on PSFCH if it fails to decode the corresponding TB after decoding the associated PSCCH. It transmits no signal on PSFCH otherwise. Details are FFS including the following:
Option 2: Receiver UE transmits HARQ-ACK on PSFCH if it successfully decodes the corresponding TB. It transmits HARQ-NACK on PSFCH if it does not successfully decode the corresponding TB after decoding the associated PSCCH which targets the receiver UE. Details are FFS including the following:

Agreements:
It is supported to enable and disable SL HARQ feedback in unicast and groupcast.

Agreements:
Study further whether to support UE sending to gNB information which may trigger scheduling retransmission resource in mode 1. FFS including
Which information to send
Which UE to send to gNB
Which channel to use
Which resource to use In RAN1 #AH_1901 meeting, RAN1 has some agreements about NR V2X, at least some of which are quoted below from R1-1901483:

Agreements:
For time domain resources of a resource pool for PSSCH,
Support the case where the resource pool consists of non-contiguous time resources Agreements:
Layer-1 destination ID can be explicitly included in SCI
The following additional information can be included in SCI
Layer-1 source ID
FFS how to determine Layer-1 source ID
FFS size of Layer-1 source ID HARQ process ID
NDI
RV Agreements:
 For determining the resource of PSFCH containing HARQ feedback, support that the time gap between PSSCH and the associated PSFCH is not signaled via PSCCH at least for modes 2(a)(c)(d) (if respectively supported)

Working assumption:
 When HARQ feedback is enabled for groupcast, support (options as identified in RAN1 #95):
  Option 1: Receiver UE transmits only HARQ NACK
  Option 2: Receiver UE transmits HARQ ACK/NACK Agreements:
 It is supported that in mode 1 for unicast, the in-coverage UE sends an indication to gNB to indicate the need for retransmission
  At least PUCCH is used to report the information
   If feasible, RAN1 reuses PUCCH defined in Rel-15
  The gNB can also schedule re-transmission resource
  FFS transmitter UE and/or receiver UE
   If receiver UE, the indication is in the form of HARQ ACK/NAK
   If transmitter UE, FFS Agreements:
 (Pre-)configuration indicates whether SL HARQ feedback is enabled or disabled in unicast and/or groupcast.
 When (pre-)configuration enables SL HARQ feedback Agreements:
 Sub-channel based resource allocation is supported for PSSCH Agreements:
 SCI decoding applied during sensing procedure provides at least information on sidelink resources indicated by the UE transmitting the SCI In RAN1 #96 meeting, RAN1 has some agreements about NR V2X, at least some of which are quoted below from R1-1905837:

Agreements:
 For the operation regarding PSSCH, a UE performs either transmission or reception in a slot on a carrier.
 NR sidelink supports for a UE:
  A case where all the symbols in a slot are available for sidelink
  Another case where only a subset of consecutive symbols in a slot is available for sidelink
   Note: this case is not intended to be used for the ITS spectra, if there is no forward-compatibility issue. Finalize in the WI phase whether there is such an issue or not
   The subset is NOT dynamically indicated to the UE
   FFS the supported slot configuration(s)
   FFS whether/how to operate it in partial coverage scenarios Agreements:
 At least for sidelink HARQ feedback, NR sidelink supports at least a PSFCH format which uses last symbol(s) available for sidelink in a slot.

Agreements:
 (Pre-)configuration indicates the time gap between PSFCH and the associated PSSCH for Mode 1 and Mode 2.

Agreements:
 Blind retransmissions of a TB are supported for SL by NR-V2X

In RAN1 #96bis meeting, RAN1 has some agreements about NR V2X, at least some of which are quoted below from R1-1905921:

Agreements:
 At least for transmission perspective of a UE in a carrier, at least TDM between PSCCH/PSSCH and PSFCH is allowed for a PSFCH format for sidelink in a slot.

Agreements:
 NR V2X supports an initial transmission of a TB without reservation, based on sensing and resource selection procedure
 NR V2X supports reservation of a sidelink resource for an initial transmission of a TB at least by an SCI associated with a different TB, based on sensing and resource selection procedure
  This functionality can be enabled/disabled by (pre-)configuration Agreements:
 It is supported, in a resource pool, that within the slots associated with the resource pool, PSFCH resources can be (pre)configured periodically with a period of N slot(s)
  N is configurable, with the following values
   1
   At least one more value>1
  The configuration should also include the possibility of no resource for PSFCH. In this case, HARQ feedback for all transmissions in the resource pool is disabled
 HARQ feedback for transmissions in a resource pool can only be sent on PSFCH in the same resource pool In RAN1 #97 meeting, RAN1 has some agreements about NR V2X, at least some of which are quoted below from Draft Report of 3GPP TSG RAN WG1 #97 v0.1.0:

Agreements:
 Transmission of PSSCH is mapped onto contiguous PRBs only

Agreements:
 Sub-channel size is (pre)configurable.

Agreements:
 Sidelink HARQ ACK/NACK report from transmitter UE to gNB is supported with details FFS.
  Note: this reverts the following agreement from RAN1 #96:
  Sidelink HARQ ACK/NACK report from UE to gNB is not supported in Rel-16.
  SR/BSR report to gNB for the purpose of requesting resources for HARQ retransmission is not supported.

Agreements:
 NR sidelink does not support performing different transmissions of a TB using different configured grants.

Agreements:
 NR V2X Mode-2 supports resource reservation for feedback-based PSSCH retransmissions by signaling associated with a prior transmission of the same TB
  FFS impact on subsequent sensing and resource selection procedures
  At least from the transmitter perspective of this TB, usage of HARQ feedback for release of unused resource(s) is supported
   No additional signaling is defined for the purpose of release of unused resources by the transmitting UE
   FFS the behavior of the receiver UE(s) of this TB and other UEs Agreements:
 RAN1 to further select between the following options of sidelink resource reservation for blind retransmissions:

Option 1: A transmission can reserve resources for none, one, or more than one blind retransmission Option 2: A transmission can reserve resource for none or one blind retransmission Agreements:

Resource selection window is defined as a time interval where a UE selects sidelink resources for transmission The resource selection window starts T1≥0 after a resource (re-)selection trigger and is bounded by at least a remaining packet delay budget FFS T1 value, whether it is measured in slots, symbols, ms, etc.

FFS other conditions

Agreements:

Support a sub-channel as the minimum granularity in frequency domain for the sensing for PSSCH resource selection No additional sensing for other channels Agreements:

For the period of N slot(s) of PSFCH resource, N=2 and N=4 are additionally supported.

Agreements:

For a PSSCH transmission with its last symbol in slot n, when the corresponding HARQ feedback is due for transmission, it is expected to be in slot n+a where a is the smallest integer larger than or equal to K with the condition that slot n+a contains PSFCH resources.

FFS details of K

Agreements:

At least for the case when the PSFCH in a slot is in response to a single PSSCH:

Implicit mechanism is used to determine at least frequency and/or code domain resource of PSFCH, within a configured resource pool. At least the following parameters are used in the implicit mechanism:

Slot index (FFS details) associated with PSCCH/PSSCH/PSFCH

Sub-channel(s) (FFS details) associated with PSCCH/PSSCH

Identifier (FFS details) to distinguish each RX UE in a group for Option 2 groupcast HARQ feedback Parts of 3GPP TS 38.213 V15.6.0 (2019-06) are quoted below:

9.1.2 Type-1 HARQ-ACK Codebook Determination

This subclause applies if the UE is configured with pdsch-HARQ-ACK-Codebook=semi-static. A UE reports HARQ-ACK information for a corresponding PDSCH reception or SPS PDSCH release only in a HARQ-ACK codebook that the UE transmits in a slot indicated by a value of a PDSCH-to-HARQ_feedback timing indicator field in a corresponding DCI format 1_0 or DCI format 1_1. The UE reports NACK value(s) for HARQ-ACK information bit(s) in a HARQ-ACK codebook that the UE transmits in a slot not indicated by a value of a PDSCH-to-HARQ_feedback timing indicator field in a corresponding DCI format 1_0 or DCI format 1_1. If the UE is provided pdsch-Aggregation-Factor, $N_{PDSCH}^{repeat}$ is a value of pdsch-AggregationFactor; otherwise, $N_{PDSCH}^{repeat}=1$. The UE reports HARQ-ACK information for a PDSCH reception from slot n−$N_{PDSCH}^{repeat}$+1 to slot n only in a HARQ-ACK codebook that the UE includes in a PUCCH or PUSCH transmission in slot n+k, where k is a number of slots indicated by the PDSCH-to-HARQ_feedback timing indicator field in a corresponding DCI format or provided by dl-DataToUL-ACK if the PDSCH-to-HARQ feedback timing field is not present in the DCI format. If the UE reports HARQ-ACK information for the PDSCH reception in a slot other than slot n+k, the UE sets a value for each corresponding HARQ-ACK information bit to NACK. If a UE reports HARQ-ACK information in a PUCCH only for a SPS PDSCH release indicated by DCI format 1_0 with counter DAI field value of 1 on the PCell, or a PDSCH reception scheduled by DCI format 1_0 with counter DAI field value of 1 on the PCell, or SPS PDSCH reception within the $M_{A,c}$ occasions for candidate PDSCH receptions as determined in Subclause 9.1.2.1, the UE determines a HARQ-ACK codebook only for the SPS PDSCH release or only for the PDSCH reception or only for the SPS PDSCH reception according to corresponding $M_{A,c}$ occasion(s) on respective serving cell(s); otherwise, the procedures in Subclause 9.1.2.1 and Subclause 9.1.2.2 for a HARQ-ACK codebook determination apply.

9.1.2.1 Type-1 HARQ-ACK Codebook in Physical Uplink Control Channel

For a serving cell c, an active DL BWP, and an active UL BWP, as described in Subclause 12, the UE determines a set of $M_{A,c}$ occasions for candidate PDSCH receptions for which the UE can transmit corresponding HARQ-ACK information in a PUCCH in slot $n_U$. If serving cell c is deactivated, the UE uses a DL BWP provided by firstActiveDownlinkBWP as the active DL BWP for determining the set of $M_{A,c}$ occasions for candidate PDSCH receptions. The determination is based:

a) on a set of slot timing values $K_1$ associated with the active UL BWP a) If the UE is configured to monitor PDCCH for DCI format 1_0 and is not configured to monitor PDCCH for DCI format 1_1 on serving cell c, $K_1$ is provided by the slot timing values {1, 2, 3, 4, 5, 6, 7, 8} for DCI format 1_0 b) If the UE is configured to monitor PDCCH for DCI format 1_1 for serving cell c, $K_1$ is provided by dl-DataToUL-ACK for DCI format 1_1 b) on a set of row indexes R of a table that is provided either by a first set of row indexes of a table that is provided by pdsch-TimeDomainAllocationList in pdsch-ConfigCommon or by Default PDSCH time domain resource allocation A [6, TS 38.214], or by the union of the first set of row indexes and a second set of row indexes, if provided by pdsch-TimeDomainAllocationList in pdsch-Config, associated with the active DL BWP and defining respective sets of slot offsets $K_0$, start and length indicators SLIV, and PDSCH mapping types for PDSCH reception as described in [6, TS 38.214]

c) on the ratio $2^{\mu_{DL}-\mu_{UL}}$ between the downlink SCS configuration $\mu_{DL}$ and the uplink SCS configuration $\mu_{UL}$ provided by subcarrierSpacing in BWP-Downlink and BWP-Uplink for the active DL BWP and the active UL BWP, respectively d) if provided, on tdd-UL-DL-ConfigurationCommon and tdd-UL-DL-ConfigurationDedicated as described in Subclause 11.1.

For the set of slot timing values $K_1$, the UE determines a set of $M_{A,c}$ occasions for candidate PDSCH receptions or SPS PDSCH releases according to the following pseudo-code. A location in the Type-1 HARQ-ACK codebook for HARQ-ACK information corresponding to a SPS PDSCH release is same as for a corresponding SPS PDSCH reception.

Set j=0—index of occasion for candidate PDSCH reception or SPS PDSCH release
Set B=Ø
Set $M_{A,c}$=Ø
Set $\ell(K_1)$ to the cardinality of set $K_1$
Set k=0–index of slot timing values $K_{1,k}$, in descending order of the slot timing values, in set $K_1$ for serving cell C
while k< $\ell(K_1)$
  if mod $(n_U-K_{1,k}+1, \max(2^{\mu_{DL}-\mu_{UL}},1))=0$
  Set $n_D$=0–index of a DL slot within an UL slot
  while $n_D<\max(2^{\mu_{DL}-\mu_{UL}},1)$
    Set R to the set of rows
    Set $\ell(R)$ to the cardinality of R
    Set r=0–index of row in set R
    if slot $n_U$ starts at a same time as or after a slot for an active DL BWP change on serving cell c or an active UL BWP change on the PCell and slot $\lfloor(n_U-K_{1,k})\cdot 2^{\mu_{DL}-\mu_{UL}}\rfloor+n_D$ is before the slot for the active DL BWP change on serving cell c or the active UL BWP change on the PCell
    continue;
    else
      while r< $\ell(R)$
        if the UE is provided tdd-UL-DL-Configuration-Common, or tdd-UL-DL-ConfigurationDedicated and, for each slot from slot $\lfloor(n_U-K_{1,k})\cdot 2^{\mu_{DL}-\mu_{UL}}\rfloor+n_D-N_{PDSCH}^{repeat}+1$ to slot $\lfloor(n_U-K_{1,k})\cdot 2^{\mu_{DL}-\mu_{UL}}\rfloor+n_D$, at least one symbol of the PDSCH time resource derived by row r is configured as UL where $K_{1,k}$ is the k-th slot timing value in set $K_1$,
        R=R\r;
        else
        r=r+1;
        end if
      end while
      if the UE does not indicate a capability to receive more than one unicast PDSCH per slot and R≠Ø,
      $M_{A,c}=M_{A,c}\cup j$;
      j=j+1;
      The UE does not expect to receive SPS PDSCH release and unicast PDSCH in a same slot;
      else
      Set $\ell(R)$ to the cardinality of R
      Set m to the smallest last OFDM symbol index, as determined by the SLIV, among all rows of R
      while R≠Ø
        Set r=0
        while r< $\ell(R)$
          if S≤m for start OFDM symbol index S for row r
          $b_{r,k,n_D}$=j;—index of occasion for candidate PDSCH reception or SPS PDSCH release associated with row r
          R=R\r;
          $B=B\cup b_{r,k,n_D}$;
          else
          r=r+1;
          end if
        end while
        $M_{A,c}=M_{A,c}\cup j$;
        j=j+1;
        Set m to the smallest last OFDM symbol index among all rows of R;
      end while
    end if
  end if
    $n_D=n_D+1$;
  end while
  end if
  k=k+1;
end while If the UE indicates a capability to receive more than one PDSCH per slot, for occasions of candidate PDSCH receptions corresponding to rows of R associated with a same value of $b_{r,k,n_D}$ where $b_{r,k,n_D} \in B$, the UE does not expect to receive more than one PDSCH in a same DL slot. If a UE receives a SPS PDSCH, or a SPS PDSCH release, or a PDSCH that is scheduled by a DCI format 1_0 and if
  the UE is configured with one serving cell, and
  $\ell(M_{A,c})=1$, and
  PDSCH-CodeBlockGroupTransmission is provided to the UE
the UE generates HARQ-ACK information only for the transport block in the PDSCH or only for the SPS PDSCH release.

If a UE receives a SPS PDSCH, or a SPS PDSCH release, or a PDSCH that is scheduled by a DCI format 1_0 and if
  the UE is configured with more than one serving cells, or
  $\ell(M_{A,c})>1$, and
  PDSCH-CodeBlockGroupTransmission is provided to the UE
the UE repeats $N_{HARQ-ACK}^{CBG/TB,max}$ times the HARQ-ACK information for the transport block in the PDSCH or for the SPS PDSCH release.

A UE does not expect to detect a DCI format switching a DL BWP within $N_3$ symbols prior to a first symbol of a PUCCH transmission where the UE multiplexes HARQ-ACK information, where $N_3$ is defined in Subclause 9.2.3.

If a UE is provided dl-DataToUL-ACK, the UE does not expect to be indicated by DCI format 1_0 a slot timing value for transmission of HARQ-ACK information that does not belong to the intersection of the set of slot timing values {1, 2, 3, 4, 5, 6, 7, 8} and the set of slot timing values provided by dl-DataToUL-ACK for the active DL BWP of a corresponding serving cell. If an occasion for a candidate PDSCH reception can be in response to a PDCCH with DCI format 1_1 and if maxNrofCodeWordsScheduledByDCI indicates reception of two transport blocks, when the UE receives a PDSCH with one transport block, the HARQ-ACK information is associated with the first transport block and the UE generates a NACK for the second transport block if harq-ACK-SpatialBundlingPUCCH is not provided and generates HARQ-ACK information with value of ACK for the second transport block if harq-ACK-SpatialBundlingPUCCH is provided.

A UE determines $\tilde{o}_0^{ACK}, \tilde{o}_1^{ACK}, \ldots, \tilde{o}_{O^{ACK}-1}^{ACK}$ HARQ-ACK information bits, for a total number of $O_{ACK}$ HARQ-ACK information bits, of a HARQ-ACK codebook for transmission in a PUCCH according to the following pseudo-code. In the following pseudo-code, if the UE does not receive a transport block or a CBG, due to the UE not detecting a corresponding DCI format 1_0 or DCI format 1_1, the UE generates a NACK value for the transport block or the CBG. The cardinality of the set $M_{A,c}$ defines a total number $M_c$ of occasions for PDSCH reception or SPS PDSCH release for serving cell c corresponding to the HARQ-ACK information bits.
Set c=0—serving cell index: lower indexes correspond to lower RRC indexes of corresponding cell
Set j=0–HARQ-ACK information bit index Set $N_{cells}^{DL}$ to the number of serving cells configured by higher layers for the UE
while $c<N_{cells}^{DL}$
  Set m=0–index of occasion for candidate PDSCH reception or SPS PDSCH release
  while $m<M_c$
    if harq-ACK-SpatialBundlingPUCCH is not provided, PDSCH-CodeBlockGroupTransmission is not provided, and the UE is configured by maxNrofCodeWordsScheduledByDCI with reception of two transport blocks for the active DL BWP of serving cell c,
      $\tilde{o}_j^{ACK}$=HARQ-ACK information bit corresponding to a first transport block of this cell;
      j=j+1;
      $\tilde{o}_j^{ACK}$=HARQ-ACK information bit corresponding to a second transport block of this cell;
      j=j+1;
    elseif harq-ACK-SpatialBundlingPUCCH is provided, and the UE is configured by maxNrofCodeWordsScheduledByDCI with reception of two transport blocks for the active DL BWP of serving cell c,
      $\tilde{o}_j^{ACK}$=binary AND operation of the HARQ-ACK information bits corresponding to first and second transport blocks of this cell—if the UE receives one transport block, the UE assumes ACK for the second transport block;
      j=j+1;
    elseif PDSCH-CodeBlockGroupTransmission is provided, and $N_{HARQ-ACK,c}^{CBG/TB,max}$ CBGs are indicated by maxCodeBlockGroupsPerTransportBlock for serving cell c,
      Set $n_{CBG}$=0 CBG index
      while $n_{CBG}<N_{HARQ-ACK,c}^{CBG/TB,max}$
        $\tilde{o}_{j+n_{CBG}}^{ACK}$=HARQ-ACK information bit corresponding to CBG $n_{CBG}$ of the first transport block;
        if the UE is configured by maxNrofCodeWordsScheduledByDCI with reception of two transport blocks for the active DL BWP of serving cell c
          $\tilde{o}_{j+n_{CBG}+N_{HARQ-ACK,c}^{CBG/TBmax}}^{ACK}$=HARQ-ACK information bit corresponding to CBG $n_{CBG}$ of the second transport block;
        end if
        $n_{CBG}=n_{CBG}+1$;
      end while
      $j=j+N_{TB,c}^{DL} \cdot N_{HARQ-ACK,c}^{CBG/TBmax}$, where $N_{TBc}^{DL}$ is the value of maxNrofCodeWordsScheduledByDCI for the active DL BWP of serving cell c;
    else
      $\tilde{o}_j^{ACK}$=HARQ-ACK information bit of serving cell c;
      j=j+1;
    end if
    m=m+1;
  end while
  c=c+1;
end while If $O_{ACK}+O_{SR}+O_{CSI} \leq 11$, the UE determines a number of HARQ-ACK information bits $n_{HARQ-ACK}$ for obtaining a transmission power for a PUCCH, as described in Subclause 7.2.1, as $$n_{HARQ-ACK} = \sum_{c=0}^{N_{cells}^{DL}-1} \sum_{m=0}^{M_c-1} N_{m,c}^{received} + \sum_{c=0}^{N_{cells}^{DL}-1} \sum_{m=0}^{M_c-1} N_{m,c}^{received,CBG}$$

where $N_{m,c}^{received}$ is the number of transport blocks the UE receives in PDSCH reception occasion m for serving cell c if harq-ACK-SpatialBundlingPUCCH and PDSCH-CodeBlockGroupTransmission are not provided, or the number of transport blocks the UE receives in PDSCH reception occasion m for serving cell c if PDSCH-CodeBlockGroupTransmission is provided and the PDSCH reception is scheduled by a DCI format 1_0, or the number of PDSCH receptions if harq-ACK-SpatialBundlingPUCCH is provided or SPS PDSCH release in PDSCH reception occasion m for serving cell c and the UE reports corresponding HARQ-ACK information in the PUCCH.

$N_{m,c}^{received,CBG}$ is the number of CBGs the UE receives in a PDSCH reception occasion m for serving cell c if PDSCH-CodeBlockGroupTransmission is provided and the PDSCH reception is scheduled by a DCI format 1_1 and the UE reports corresponding HARQ-ACK information in the PUCCH.

In RAN1 #98 meeting, RAN1 has some agreements about NR V2X, at least some of which are quoted below from Draft Report of 3GPP TSG RAN WG1 #98 v0.1.0:

Agreements:
  In physical layer perspective, a (pre-)configured resource pool can be used for all of unicast, groupcast, and broadcast for a given UE.
  There is no (pre-)configuration to inform which cast types are used for the resource pool.
Agreements:
  Support 2-stage SCI
    1st SCI is carried in PSCCH.
Agreements:
  For Mode-1, support both same-carrier & cross-carrier scheduling from gNB to NR SL
    Whether or not to have the cross-carrier scheduling indicator in the DCI given that there is only one SL carrier for a UE in Rel-16
Agreements:
  At least for dynamic grant, the timing and resource for PUCCH used for conveying SL HARQ feedback to the gNB are based on the indication(s) in the corresponding PDCCH
Agreements:
  DCI indicates the slot offset between DCI reception and the first sidelink transmission scheduled by DCI.
    The minimum gap between DCI and the first scheduled sidelink transmission is not smaller than the corresponding UE processing time.
Agreements:
  At least for mode 2, The maximum number of SL resources $N_{MAX}$ reserved by one transmission including current transmission is [2 or 3 or 4]
    Aim to select the particular number in RAN1 #98
    $N_{MAX}$ is the same regardless of whether HARQ feedback is enabled or disabled
Agreements:
  At least for mode 2, (Pre-)configuration can limit the maximum number of HARQ (re-)transmissions of a TB Up to 32
    If no (pre)configuration, the maximum number is not specified
    Note: this (pre-)configuration information is NOT intended for the Rx UE Agreements:
  In Mode-2, SCI payload indicates sub-channel(s) and slot(s) used by a UE and/or reserved by a UE for PSSCH (re-)transmission(s)
  SL minimum resource allocation unit is a slot
Working assumption:
  An indication of a priority of a sidelink transmission is carried by SCI payload
    This indication is used for sensing and resource (re)selection procedures
    This priority is not necessarily the higher layer priority
Agreements:
  The resource (re-)selection procedure includes the following steps
    Step 1: Identification of candidate resources within the resource selection window
      FFS details
    Step 2: Resource selection for (re-)transmission(s) from the identified candidate resources
      FFS details
Agreements:
  In Step 1 of the resource (re-)selection procedure, a resource is not considered as a candidate resource if:
    The resource is indicated in a received SCI and the associated L1 SL-RSRP measurement is above an SL-RSRP threshold
      The SL-RSRP threshold is at least a function of the priority of the SL transmission indicated in the received SCI and the priority of the transmission for which resources are being selected by the UE
Agreements:
  For PSSCH-to-HARQ feedback timing, to down-select:
    Option 1: K is the number of logical slots (i.e., the slots within the resource pool)
    Option 2: K is the number of physical slots (i.e., the slots within and outside the resource pool)
    FFS how to determine K.
Agreements:
  For TX-RX distance-based HARQ feedback for groupcast Option 1,
    The location information of TX UE is indicated by the $2^{nd}$ stage SCI payload
      FFS whether/how higher layer signaling is also used in signaling the location information
      FFS whether/how to handle when the location information is not available at TX and/or RX UE.
Agreements:
  For Case 1 (PSFCH TX/RX overlap),
    Select PSFCH TX or RX based on priority rule
      Priority rule is based on at least priority indication in the associated PSCCH/PSSCH.
      FFS: Other priority rule (e.g. TX/RX, cast type, HARQ state, HARQ feedback option, number of (re)transmission of PSCCH/PSSCH), up to UE implementation
  For Case 2 (PSFCH TX to multiple UEs),
    Select N PSFCH(s) transmissions based on priority rule
      Priority rule is based on at least priority indication in the associated PSCCH/PSSCH.
      FFS: Other priority rule (e.g. cast type, HARQ state, HARQ feedback option, number of (re)transmission of PSCCH/PSSCH, collision status, etc.), up to UE implementation
  For Case 3 (PSFCH TX with multiple HARQ feedback to the same UE),
    FFS including whether to support multiple HARQ feedback bits are multiplexed on a PSFCH, whether to apply the solution of Case 2
Parts of Draft Report of 3GPP TSG RAN WG1 #98bis v0.1.0 are quoted below:
Agreements:
  A slot is the time-domain granularity for resource pool configuration.
    To down-select:
      Alt 1. Slots for a resource pool is (pre-)configured with bitmap, which is applied with periodicity
      Alt 2. Slots for a resource pool is (pre-)configured, where the slots are applied with periodicity.
Agreements:
  Support (pre-)configuration of a resource pool consisting of contiguous PRBs only
Agreements:
  For the number of bits of L1 IDs,
    Layer-1 destination ID: 16 bits
    Layer-1 source ID: 8 bits
Agreements:
  PSCCH for $1^{st}$ stage SCI with 2 and 3 symbols is supported in Rel-16.
    FFS: other length(s) of symbols (e.g., all symbols)
    The number of symbols above excludes AGC symbols if any
  The number of PSCCH symbols is explicitly (pre-)configured per Tx/Rx resource pool
Agreements:
  The $2^{nd}$ stage SCI is carried within the resource of the corresponding PSSCH.
  Scrambling operation for the $2^{nd}$ stage SCI is applied separately with PSSCH
Agreements:
  Support $1^{st}$ stage SCI in PSCCH in one subchannel only. Within one subchannel, there is at most one $1^{st}$ stage SCI, except for spatial re-use
Agreements:
  Support {10, 15, 20, 25, 50, 75, 100} PRBs for possible sub-channel size.
    FFS other values (e.g., 4, 5, 6, etc.)
  One value of the above set is (pre)configured for the sub-channel size for the resource pool.
  Size of PSCCH: X
    X≤N, where N is the number of PRBs of the subchannel
    X is (pre)-configurable with values FFS, X
Agreements:
  In Mode-1, for a UE, for each of the configured MCS tables (for both DG & CG):
    If no MCS is configured, UE autonomously selects MCS from the full range of values
      Up to UE implementation
      FFS details for the MCS table
    If a single MCS is configured, the MCS is used by the UE
    If a range of two or more MCSs are configured, UE autonomously selects the MCS from the configured values
      Up to UE implementation
Agreements:
  To signal the gap between DCI reception and the first sidelink transmission scheduled by DCI:
    A table of values is configured by RRC.
    DCI determines which of the configured values is used.

Agreements:

For reporting SL HARQ-ACK to the gNB:
  For dynamic grant and configured grant type-2 in SL, the Rel-15 procedure and signalling for DL HARQ-ACK are reused for the purpose of selecting PUCCH offset/resource and format in UL.
    The configuration for SL is separate from Uu link for a UE
    FFS how to indicate timing of transmission in PUCCH, including whether physical or logical slots are used
  For configured grant type-1 in SL, RRC is used to configure PUCCH offset/resource and format in UL (if supported)

Agreements:
  Two different UE-specific SL RNTIs are introduced for Mode-1 scheduling: one for CRC scrambling in DCI for a dynamic grant and the other one for CRC scrambling in DCI for a configured grant type-2.
    The two above DCIs have the same size Agreements:
  Multiple type-1 configured grants per UE are supported when LTE Uu controls NR SL
    Up to the same max number of type-1 configured grants per UE when NR Uu controls NR SL
Working assumption:
  Each transmission in a resource provided by a configured grant contains PSCCH and PSSCH.

Agreements:
  For a configured grant in Mode 1 when using SL HARQ feedback:
    There is only one HARQ-ACK bit for the configured grant
    There is one PUCCH transmission occasion after the last resource in the set of resources provided by a configured grant.

Agreements:
  Maximum number of HARQ (re-)transmissions is (pre-)configured per priority per CBR range per transmission resource pool
    The priority is the one signaled in SCI
    This includes both blind and feedback-based HARQ (re)-transmission
  The value range is any value from 1 to 32
    If the HARQ (re)transmissions for a TB can have a mixed blind and feedback-based approached (FFS whether or not to support this case), the counter applies to the combined total Agreements:
  Resource (re-)selection procedure supports re-evaluation of Step 1 and Step 2 before transmission of SCI with reservation
    The re-evaluation of the (re-)selection procedure for a resource reservation signalled in a moment 'm' is not required to be triggered at moment>'m−T3' (i.e. resource reselection processing time needs to be ensured)

Agreements:
  For PSFCH power control,
    It is supported that the open-loop power control is based on the pathloss between PSFCH TX UE and gNB (if PSFCH TX UE is in-coverage):
      The nominal power and alpha for PSFCH power control are configured separately from the parameters used for PSCCH/PSSCH power control.
    (working assumption) Sidelink pathloss based PSFCH power control is not supported.

Agreements:
  L3-filtered sidelink RSRP reporting (from RX UE to TX UE) for open-loop power control for PSCCH/PSSCH uses higher layer signaling.
    Details (e.g., reporting layer, triggering condition, etc.) are up to RAN2.
    FFS: Other details Agreements:
  For PSSCH-to-HARQ feedback timing, K is the number of logical slots (i.e. the slots within the resource pool)
Working assumption:
  For TX-RX distance-based HARQ feedback for groupcast Option 1,
    Zone is (pre-)configured with respect to geographical area, and Zone ID associated with TE UE's location is indicated by SCI.
    Details FFS
    Note: this does not intend to impact the discussion on the zone based resource allocation.

Agreements:
  For the communication range requirement for TX-RX distance-based HARQ feedback, explicit indication in the $2^{nd}$ stage SCI is used.
    FFS details
Working assumption:
  For HARQ feedback in groupcast and unicast, when PSFCH resource is (pre-)configured in the resource pool,
    SCI explicitly indicates whether HARQ feedback is used or not for the corresponding PSSCH transmission.

Parts of Draft Report of 3GPP TSG RAN WG1 #99 v0.1.0 are quoted below:
Working assumption:
  The timing of the PUCCH used for conveying SL HARQ is indicated in DCI or RRC (only for transmissions without a DCI) in terms of PSFCH-to-PUCCH physical slots, where the slot duration is defined based on the PUCCH SCS.
  Note: it is not intended to define any new sync requirements for gNBs Conclusion No support of multiplexing of SL HARQ and Uu UCI on PUCCH or PUSCH in Rel-16
  Note: this reverts the agreements made during RAN1 #98b email discussion Agreements:
  For case of DG and type 2 CG: one combination of "timing and resource for PUCCH" is used to indicate that PUCCH resource is not provided
  For type 1 CG: no RRC configuration of PUCCH resources indicates that PUCCH resource is not provided Some or all of the following terminology and assumptions may be used hereafter.
  BS: a network central unit and/or a network node in New Radio Access Technology (NR) which is used to control one or more transmission and reception points (TRPs) which are associated with one or more cells. Communication between BS and TRP(s) is via fronthaul. BS may be referred to as central unit (CU), eNB, gNB, and/or NodeB.
  Cell: a cell is composed of one or more associated TRPs, i.e. coverage of the cell is composed of coverage of some and/or all associated TRP(s). One cell is controlled by one BS. Cell may be referred to as TRP group (TRPG).

NR-Physical Downlink Control Channel (PDCCH): A channel carries downlink control signal which is used to control communication between a UE and a network side. A network transmits NR-PDCCH on a configured control resource set (CORESET) to the UE.

Uplink-control signal (UL-control signal): A UL-control signal may be at least one of scheduling request (SR), Channel State Information (CSI), Hybrid Automatic Repeat reQuest (HARQ)-Acknowledgement (HARQ-ACK) and/or HARQ-Negative Acknowledgement (HARQ-NACK) for downlink transmission, etc.

Slot: a scheduling unit in NR. Slot duration may be 14 OFDM symbols.

For network side:

Downlink timing of TRPs in the same cell are synchronized.

Radio Resource Control (RRC) layer of network side is in BS.

For UE side:

There are at least two UE (RRC) states: connected state (also called active state) and non-connected state (also called inactive state and/or idle state). Inactive state may be an additional state and/or belong to connected state and/or non-connected state.

In a NR Uu Rel-15 system, two types of HARQ-ACK codebooks are introduced (e.g., semi-static codebook and dynamic codebook). A NR Uu HARQ-ACK codebook may be transmitted in a Physical Uplink Control Channel (PUCCH) or Physical Uplink Shared Channel (PUSCH). Exemplary implementation of a HARQ-ACK codebook size determination procedure is described as follows. Assuming the PUCCH or PUSCH is transmitted in a slot "n", the NR Uu HARQ-ACK codebook may comprise one or more HARQ-ACK bits associated with one or more PDSCHs (e.g., one or more PDSCHs that are not overlapped in time domain) in one or more slots "$n_u$-k1", wherein k1 is a time offset corresponding to a number of physical slots from a PDSCH slot "$n_D$" to the uplink slot "$n_u$". There may be one time offset, and thus one k1 value. Alternatively and/or additionally, there may be multiple time offsets, and thus multiple k1 values. In some examples, each time offset of a set of time offsets (e.g., a set of one or more time offsets) is determined and/or derived based upon a subcarrier spacing (SCS) of one or more uplink slots. Alternatively and/or additionally, the slot "$n_D$" may map to a slot "$n_u$-k1" with aligned ending slot boundary and/or ending position (e.g., an ending slot boundary and/or an ending position of the slot "$n_D$" may be aligned with an ending slot boundary and/or an ending position of the slot "$n_u$-k1"). In some examples, some cell-specific uplink slots and/or OFDM symbols may be excluded from determining the NR Uu HARQ-ACK codebook since no PDSCH reception in those slots and/or those symbols is expected. In NR Uu, a codebook size is determined based upon a number of configured time offsets (e.g., a number of configured k1 values). The number and/or the amount of configured time offsets may be UE-specific. In an example, downlink Bandwidth Part (BWP) and uplink BWP may be configured with a same SCS and a UE is configured with a set of k1 values (e.g., k1={1, 2, 3, 4}). The UE may determine (and/or derive) to transmit a NR Uu HARQ-ACK codebook in slot "$n_u$". The UE may determine a set of occasions to determine a size of the NR Uu HARQ-ACK codebook based upon the set of k1 values. In this example, slot "$n_u$-k1" may be associated with one occasion (e.g., only one possible occasion) for PDSCH reception, for Semi-Persistent Scheduling (SPS) release PDCCH reception or for cell group (CG) type release PDCCH reception. In this example, the size of the NR Uu HARQ-ACK codebook would be 4 and each HARQ-ACK bit in the codebook may be associated with each occasion in slot "$n_u$-k1". Considering type-1 codebook (e.g., semi-static codebook), if the UE does not receive PDCCH and/or PDSCH in slot "$n_u$-k1", the UE may determine (and/or derive) to transmit NACK on the occasion (e.g., associated with slot "$n_u$-k1") to keep and/or maintain the same codebook size.

In NR sidelink (SL) V2X, a transmitter (TX) device (e.g., a TX UE) in network scheduling mode (e.g., NR sidelink V2X mode-1) performs sidelink transmission on one or more resources scheduled by a network (e.g., gNB). The TX UE may be configured with a set of k1' values (e.g., the TX UE may be configured with the set of k1' values via a UE-specific configuration). Each k1' value of the set of k1' values may denote a time offset corresponding to a number of physical slots from a PSFCH slot "$n_f$" to an uplink slot "$n_u$" (e.g., a PUCCH slot). In some examples, each k1' value of the set of k1' values may be derived based upon SCS of one or more uplink slots. The TX UE may report a PUCCH resource or PUSCH resource (e.g., one PUCCH resource or PUSCH resource), delivering one or more sidelink HARQ-ACKs, to a network. The one or more sidelink HARQ-ACKs are transmitted by one or more peer UEs (e.g., peer UEs of the TX UE). However, reusing a codebook size determination from NR Uu may cause resource non-efficiency (e.g., inefficient operation) since there may be one or more slots, among a set of slots associated with the set of k1' values, which do not comprise (e.g., contain) a PSFCH resource. Accordingly, reporting such information according to one k1' value may not be efficient. The issue of inefficiency may occur when the one or more slots do not comprise a resource in a sidelink resource pool and/or when the one or more slots, in a sidelink resource pool, do not have a PSFCH resource (e.g., a pre-configured PSFCH resource) and a PSFCH slot periodicity, N, associated with the sidelink resource pool is larger than 1 (e.g., N=2 or 4). For example, considering example 3 in FIG. 8 (described below), according to NR Uu, a codebook size may correspond to 8 (i.e., the number of configured PSFCH to PUCCH offsets, such as a number of k1' vales of a set of k1' values, may correspond to 8), and a corresponding association set may cover some slots which do not belong to a corresponding sidelink resource pool. In another example, considering example 4 in FIG. 8 (described below), according to NR Uu, a codebook size may correspond to 8 (i.e., the number of configured PSFCH to PUCCH offsets, such as a number of k1' vales of a set of k1' values, may correspond to 8), and a corresponding association set may cover some slots which do not belong to a corresponding sidelink resource pool and/or do not comprise PSFCH resource. Another issue for sidelink HARQ-ACK codebook determination is an impact of the PSFCH slot periodicity. When PSFCH slot periodicity is N=2 or 4 slots (e.g., where a PSFCH slot is present in each set of N slots in a sidelink resource pool), one PSFCH slot may comprise PSFCHs associated with N sidelink slots (e.g., N=2 or 4). In an example, a slot in a sidelink resource pool is denoted as "$t_n$", and a PSFCH slot periodicity is configured (e.g., pre-configured) as N=2 slots in the sidelink resource pool. Regarding a slot "$t_x$" comprising one or more PSFCH slots in the sidelink resource pool, one or more PSFCHs in the slot "$t_x$" may be associated with sidelink transmissions (e.g., Physical Sidelink Control Channel (PSCCH) and/or Physical Sidelink Shared Channel (PSSCH)) in N slots (e.g., "$t_{x-2}$", "$t_{x-3}$"). One or more PSFCH resources in the PSFCH slot (e.g., all PSFCH resources in the PSFCH slot) may comprise the same OFDM symbols in the PSFCH slot (e.g., last two sidelink OFDM symbols). In other words, for a given k1' value, slot "$n_u$-k1'" may be associated with N PSFCH resources (e.g., PSFCH resources overlapping in time domain) and the TX UE may be unable, or it may be difficult for the TX UE, to determine the size of the sidelink HARQ-ACK codebook, such as determining the size based upon NR Uu HARQ-ACK codebook size determination. In summary, among the slots "$n_u$-k1'", a number of slots belonging to a sidelink resource pool may change and/or a number of slots with PSFCH resources may change. Accordingly, how to determine a size of a sidelink HARQ-ACK codebook needs to be solved.

One concept of the present disclosure is that a first UE transmits a sidelink HARQ-ACK codebook to a network, wherein a size of the sidelink HARQ-ACK codebook is determined (and/or derived) based upon a first number of occasions. In some examples, the size of the sidelink HARQ-ACK codebook is equal to the first number of occasions. In some examples, the size of the sidelink HARQ-ACK codebook corresponds to a number of bits of the sidelink HARQ-ACK codebook. Alternatively and/or additionally, the size of the sidelink HARQ-ACK codebook may correspond to a number of sidelink HARQ-ACKs (e.g., sidelink HARQ-ACKs associated with sidelink transmissions) indicated by the sidelink HARQ-ACK codebook.

In some examples, the first UE transmits the sidelink HARQ-ACK codebook in a slot "$n_u$". In some examples, the slot "$n_u$" comprises one or more uplink resources. In some examples, the first UE is configured with a set of time offsets (e.g., a set of one or more time offsets comprising one or more k1' values). In some examples, each time offset (e.g., k1') of the set of time offsets corresponds to a number of physical slots from a PSFCH slot "$n_f$" to an uplink slot "$n_u$". In some examples, the first UE derives an association set based upon the set of time offsets. In some examples, the association set may be denoted as "$n_u$-k1'", wherein k1' values comprise time offset values in the set of time offsets (e.g., the k1' values comprise all time offset values configured in the set of time offsets). In an example where the set of time offsets comprise a k1' value of 3 and a k1' value of 4, the association set may comprise slots "$n_u$-3" and "$n_u$-4". In some examples, the association set is associated with the uplink slot "$n_u$". For example, one or more sidelink HARQ-ACKs received in one or more slots in the association set may be transmitted (by the first UE) in the same uplink slot "n".

Alternatively and/or additionally, the first UE may determine and/or derive an association set based upon a PSFCH set configuration. The PSFCH set configuration may indicate which slots, comprising one or more PSFCH resources, are associated with a same association set. In some examples, the PSFCH set configuration may indicate a set of values. A value i may be indicative of the most recent i-th slot comprising a PSFCH resource (e.g., the most recent i-th slot with respect to a time and/or slot of transmission of the sidelink HARQ-ACK codebook to a network). In some examples, the PSFCH set configuration may indicate one or more values, such as a value j. The value j may be indicative of the most recent $1^{st}$~j-th slots comprising a PSFCH resource (e.g., the most recent $1^{st}$~j-th slots with respect to a time and/or slot of transmission of the sidelink HARQ-ACK codebook to the network).

The first number of occasions may be (and/or may be determined and/or derived based upon) a number of slots (e.g., a number of possible slots) comprising one or more PSCCH resources and/or one or more PSSCH resources associated with a slot "$n_f$", comprising one or more PSFCH resources, which is in an association set (e.g., the association set may correspond to a set of one or more slots "$n_u$-k1'"). For a sidelink HARQ-ACK codebook in a slot "n", the first number of occasions may be (and/or may be determined and/or derived based upon) a number of slots (e.g., a number of possible slots) comprising one or more PSCCH resources and/or one or more PSSCH resources associated with each slot "$n_f$" of one or more slots "$n_f$" in an association set "$n_u$-k1'", wherein one or more slots "$n_f$" refers to one or more slots (e.g., one or more sidelink slots) comprising one or more PSFCH resources.

Alternatively and/or additionally, the first number of occasions may be (and/or may be determined and/or derived based upon) a number of slots, comprising one or more PSFCH resources, in an association set and/or a periodicity of PSFCH slots (e.g., the periodicity may be configured, such as pre-configured, for a sidelink resource pool). For example, the periodicity may correspond to N (e.g., each set of N slots in the sidelink resource pool may comprise a PSFCH resource, such as where every Nth slot in the sidelink resource pool comprises a PSFCH resource). In some examples, the first number of occasions is equal to a product of the periodicity and a number of slots, in the association set, comprising one or more PSFCH resources times (e.g., #PSFCH slots×N, where #PSFCH slots corresponds to the number of slots, in the association set, that comprise one or more PSFCH resources). In some examples, N denotes the periodicity of PSFCH slot in a sidelink resource pool. In some examples, N is in units of slots in the sidelink resource pool. In some examples, N is counted by logical slot (associated with the sidelink resource pool).

The first number of occasions may be (and/or may be determined and/or derived based upon) a number of one or more first occasions. Regarding an occasion (e.g., each occasion) of the one or more first occasions, at least one of the following may be true: the occasion is a slot in a sidelink resource pool comprising a PSCCH resource and/or a PSSCH resource; a network transmits a sidelink grant to the first UE to perform sidelink transmission on the occasion; the first UE performs sidelink transmission on the occasion; the first UE receives a sidelink HARQ-ACK associated with the sidelink transmission in a slot "$n_f$", wherein the slot "$n_f$" is associated with the occasion; the first UE may not receive a sidelink HARQ-ACK associated with the occasion; or the first UE may not perform sidelink transmission on the occasion. A sidelink HARQ-ACK associated with an occasion could be ACK or NACK.

In some examples, each set of N (e.g., the periodicity) occasions of the one or more first occasions may be a "PSFCH occasion" (e.g., every Nth occasion of the one or more first occasions may be an "PSFCH occasion"). For example, in a scenario in which the one or more first occasions comprise occasions 1, 2, 3 and 4, and in which N=2, PSFCH occasions of the one or more first occasions may comprise occasions 2 and 4, or PSFCH occasions of the one or more first occasions may comprise occasions 1 and 3. Regarding one or more PSFCH occasions (e.g., each PSFCH occasion) of the one or more first occasions, at least one of the following may be true: the one or more PSFCH occasions are in one or more same slots as one or more PSFCH resources, such as where a PSFCH occasion and a PSFCH resource are in a same PSFCH slot "$n_f$"; the PSFCH resource comprises the same OFDM symbols and/or different frequency resources (e.g., different Physical Resource Blocks (PRBs)) as the PSFCH occasion in the same slot; the one or more PSFCH occasions are each associated with N slots, respectively; a network transmits a sidelink grant to the first UE to perform sidelink transmission, wherein the first UE receives sidelink HARQ-ACK associated with the sidelink transmission on a PSFCH occasion of the one or more first occasions; the first UE may not receive sidelink HARQ-ACK on the PSFCH occasion of the one or more first occasions; or the first UE may not perform sidelink transmission in a slot that is associated with a PSFCH occasion of the one or more first occasions.

In some examples, the first UE determines the first number of occasions regardless of and/or without consideration of a timing of an occasion that the first UE performs monitoring sidelink HARQ-ACK, receiving sidelink HARQ-ACK and/or transmitting sidelink HARQ-ACK.

In some examples, when (and/or if) the first UE determines to perform PSFCH transmission and the first UE does not receive PSFCH on a PSFCH occasion of the one or more first occasions (such as where PSFCH is not received on the PSFCH occasion at the same time that the first UE performs the PSFCH transmission), the first UE determines the first number of occasions by counting the PSFCH occasion (e.g., the PSFCH occasion, in which the PSFCH is not received, is counted in determining the first number of occasions).

In some examples, when (and/or if) the first UE determines to perform sidelink transmission on a PSFCH resource, the first UE does not perform monitoring and/or receiving of PSFCH during the same time (e.g., the same time that the first UE performs the PSFCH transmission).

In some examples, the first UE determines whether or not to perform transmitting a first PSFCH or to perform monitoring and/or receiving a second PSFCH based upon a first priority of sidelink data associated with the first PSFCH and/or a second priority of sidelink data associated with the second PSFCH. For example, when (and/or if) the first PSFCH and the second PSFCH are in a same time, and the first priority is higher than the second priority, the first UE may perform transmitting the first PSFCH and may not perform monitoring and/or receiving the second PSFCH. Alternatively and/or additionally, when (and/or if) the first PSFCH and the second PSFCH are in a same time, and the second priority is higher than the first priority, the first UE may perform monitoring and/or receiving the second PSFCH and may not perform transmitting the first PSFCH.

In some examples, the first UE determines the first number of occasions regardless of (and/or without consideration of) which cast-type of a sidelink transmission is on an occasion of the one or more first occasions and/or regardless of (and/or without consideration of) whether or not sidelink HARQ-ACK associated with an occasion is enabled (e.g., sidelink HARQ-ACK may be enabled and/or disabled by SCI). In some examples, when (and/or if) the first UE performs a sidelink transmission on an occasion based upon scheduling of a network and the sidelink transmission is without sidelink HARQ-ACK feedback (e.g., the first UE performs broadcast sidelink transmission and/or the first UE disables the sidelink HARQ-ACK feedback), the first UE counts the occasion into the first number of occasions (e.g., the occasion is counted in determining the first number of occasions). In some examples, the first UE counts the occasion into the first number of occasions (e.g., the occasion is counted by the UE in determining the first number of occasions) when (and/or if) scheduling of the network indicates an uplink slot or uplink resource for reporting sidelink HARQ-ACK of the occasion.

In some examples, the first UE determines the first number of occasions regardless of (and/or without consideration of) which cast-type of a sidelink transmission is associated with an occasion (among the one or more first occasions) and/or regardless of (and/or without consideration of) one or more occasions (among the one or more first occasions) associated with one or more sidelink transmissions without sidelink HARQ-ACK feedback (e.g., a sidelink transmission without sidelink HARQ-ACK feedback may correspond to a broadcast sidelink transmission and/or a sidelink transmission where the first UE disables the sidelink HARQ-ACK feedback for the sidelink transmission). In some examples, when (and/or if) the first UE performs a sidelink transmission based upon scheduling of a network and the sidelink transmission is without sidelink HARQ-ACK feedback, the first UE does not receive sidelink HARQ-ACK in an occasion (e.g., an occasion associated with the sidelink transmission) because the sidelink transmission is without sidelink HARQ-ACK feedback (e.g., sidelink HARQ-ACK feedback is not enabled for the sidelink transmission). The first UE may count the occasion (e.g., the occasion associated with the sidelink transmission) into the first number of occasions (e.g., the occasion is counted by the UE in determining the first number of occasions). In some examples, the first UE counts the occasion into the first number of occasions (e.g., the occasion is counted by the UE in determining the first number of occasions) when (and/or if) scheduling of the network indicates an uplink slot or uplink resource for reporting sidelink HARQ-ACK of the occasion.

In some examples, the first UE is in NR V2X mode-1 (e.g., network scheduling mode).

In some examples, the first UE establishes one or more unicast sidelink connections with one or more paired UEs.

In some examples, the first UE performs unicast sidelink transmission to a second UE (e.g., a paired UE).

In some examples, the first UE receives a Downlink Control Information (DCI) or a sidelink grant from a network.

In some examples, the first UE performs sidelink transmission on a resource and/or a slot in a sidelink resource pool based upon the DCI or the sidelink grant.

In some examples, the DCI or the sidelink grant indicates a time offset which is among the set of time offsets.

In some examples, the DCI or the sidelink grant may indicate an uplink resource for reporting sidelink HARQ-ACK associated with a resource (e.g., a resource scheduled by the DCI or the sidelink grant, such as for performing sidelink transmission).

In some examples, if the DCI or the sidelink grant does not indicate a time offset and/or does not indicate the uplink resource, the first UE does not count the resource into the first number of occasions (e.g., the resource may not be counted as an occasion in determining the first number of occasions).

In some examples, if the DCI or the sidelink grant does not indicate a time offset and/or does not indicate the uplink resource, the first UE counts the resource (e.g., the resource scheduled by the DCI or the sidelink grant) into the first number of occasions (e.g., the resource may be counted as an occasion in determining the first number of occasions), and the first UE may transmit ACK for the occasion and/or an indication that there is no need for retransmission for the resource.

In some examples, the first UE transmits the sidelink transmission to the second UE.

In some examples, the sidelink transmission is unicast and/or the sidelink transmission is with sidelink HARQ-ACK feedback (e.g., sidelink HARQ-ACK feedback is enabled for the sidelink transmission).

Figure 5:
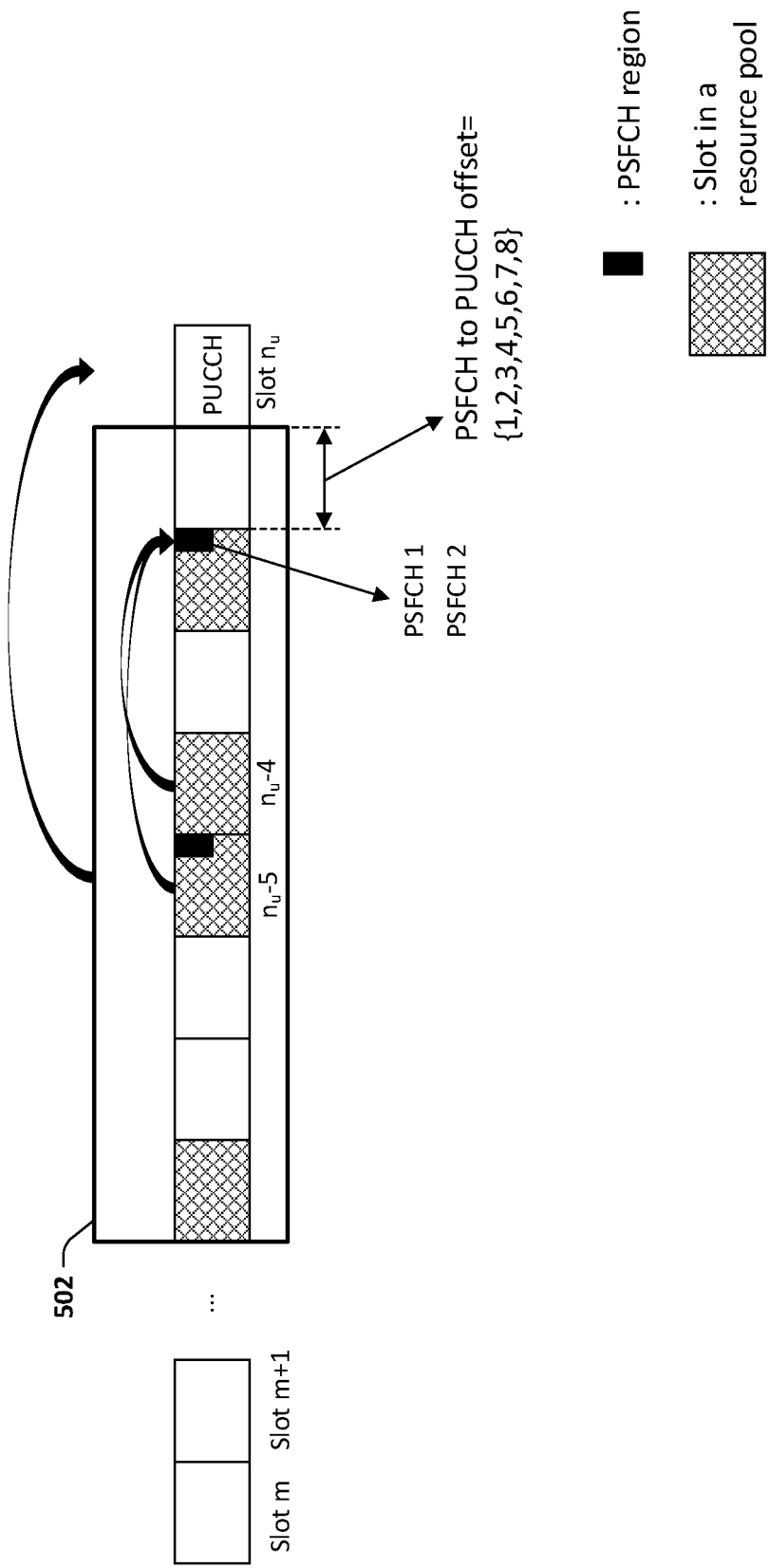
FIG. 5 is a diagram illustrating an exemplary scenario associated with sidelink Hybrid Automatic Repeat Request acknowledgement (HARQ-ACK) according to one exemplary embodiment.

In some examples, the first UE determines an uplink resource based upon a last received DCI or sidelink grant in time domain (e.g., a DCI or sidelink grant most recently received in time domain). FIG. 5 illustrates an exemplary scenario associated with sidelink HARQ-ACK according to some embodiments. The first UE (e.g., a TX UE) receives a first sidelink grant in slot m scheduling sidelink transmission in slot $n_u-5$ and receives a second sidelink grant in slot m+1 scheduling sidelink transmission in slot $n_u-4$. In this example, the first sidelink grant and the second grant indicate to transmit a report of sidelink HARQ-ACK in slot $n_u$ (e.g., a report indicating sidelink HARQ-ACK feedback, such as a sidelink HARQ-ACK codebook, associated with the sidelink transmission in slot $n_u-5$ and/or the sidelink transmission in slot $n_u-4$). In some examples, the first sidelink grant indicates a first PUCCH resource in slot $n_u$ and the second sidelink grant indicates a second PUCCH resource in slot $n_u$. The first UE may generate a sidelink HARQ-ACK codebook (such as indicative of sidelink HARQ-ACK feedback associated with the sidelink transmission in slot $n_u-5$ and/or the sidelink transmission in slot $n_u-4$). The first UE may transmit the sidelink HARQ-ACK codebook on the second PUCCH resource, such as based upon the second PUCCH resource being indicated by the second sidelink grant (e.g., the last received sidelink grant in time domain).

In some examples, the last received DCI or sidelink grant schedules a resource, wherein the resource is associated with a PSFCH resource in the association set.

In some examples, the last received DCI or sidelink grant schedules a latest resource (e.g., a latest resource of one or more resources scheduled by one or more DCIs and/or sidelink grants), wherein the latest resource is associated with a PSFCH resource in the association set.

In some examples, the last received DCI or sidelink grant schedules a resource, wherein the resource is associated with a PSFCH resource that is the last PSFCH in time domain in the association set.

In some examples, the first UE transmits the sidelink HARQ-ACK codebook in a PUCCH resource or a PUSCH resource (e.g., in slot $n_u$).

In some examples, the first UE is configured with one or more sidelink resource pools in a carrier. For example, the first UE may be configured with a first sidelink resource pool and a second sidelink resource pool in a carrier. In some examples, a first PSFCH periodicity (e.g., a PSFCH slot periodicity) configured (e.g., pre-configured) in the first sidelink resource pool may be different than a second PSFCH periodicity (e.g., a PSFCH slot periodicity) configured (e.g., pre-configured) in the second sidelink resource pool. Alternatively and/or additionally, the first PSFCH periodicity may be the same as the second PSFCH periodicity. In some examples, the set of time offsets is configured in a dedicated signaling (e.g., dedicated RRC signaling) or system information (e.g., broadcast signaling).

Figure 6:
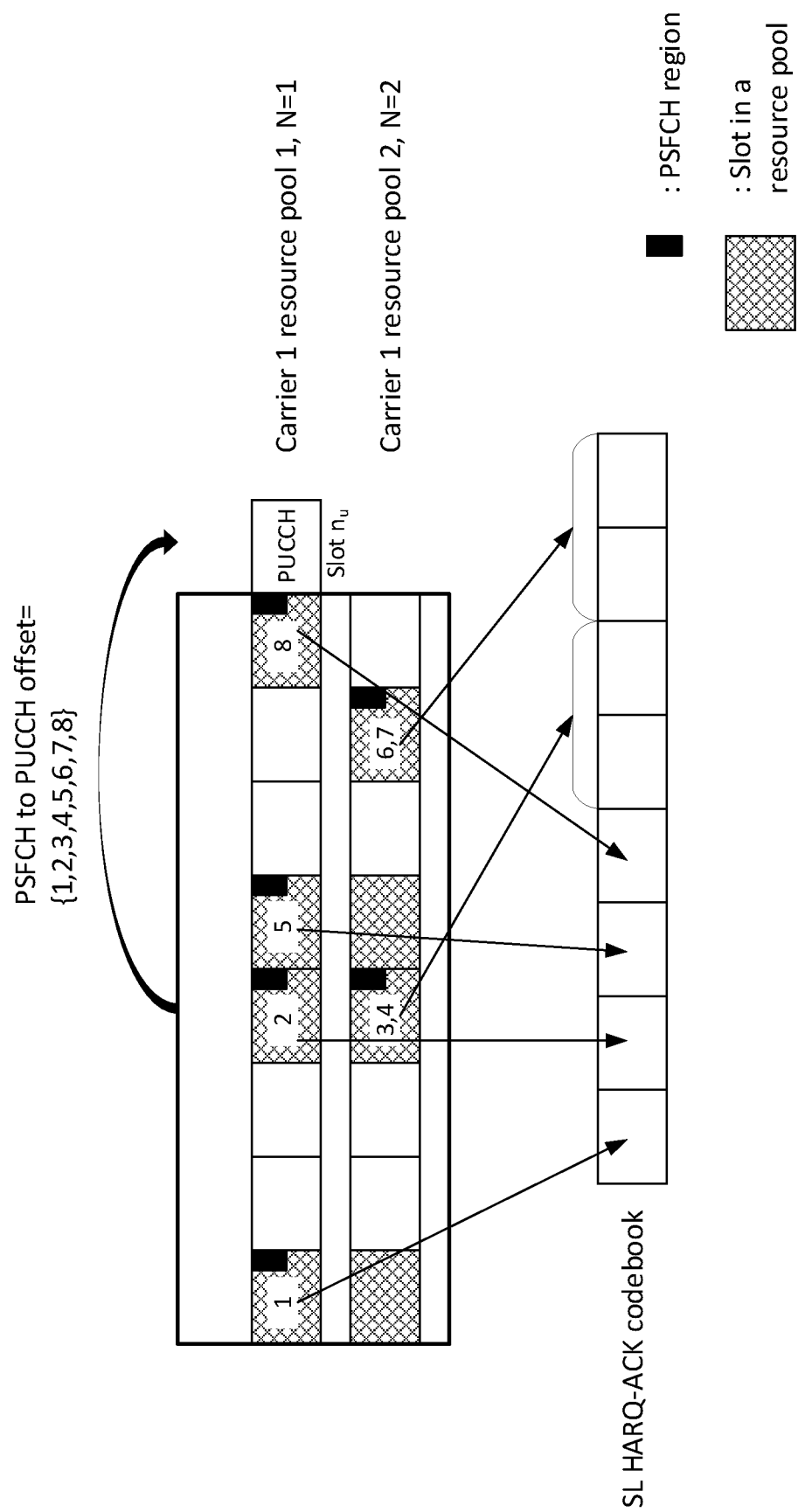
FIG. 6 is a diagram illustrating an exemplary scenario associated with sidelink HARQ-ACK codebook construction according to one exemplary embodiment.

FIG. 6 illustrates an exemplary scenario associated with sidelink HARQ-ACK codebook construction according to some embodiments. In some examples, the first UE (e.g., a TX UE) is configured with two sidelink resource pools in carrier 1. A first PSFCH periodicity, configured for resource pool 1, is N1=1. A second PSFCH periodicity, configured for resource pool 2, is N2=2. Slots that belong to a corresponding resource pool are shown as pattern-filled slots in FIG. 6. Resource pool 1 and resource pool 2 may be orthogonal or be separated in frequency domain. Resource pool 1 and resource pool 2 may overlap in time domain.

An order (e.g., arrangement) of the sidelink HARQ-ACK codebook is determined based upon slot index and/or pool index.

In some examples, sidelink HARQ-ACKs of the sidelink HARQ-ACK codebook may be ordered by initially ordering the sidelink HARQ-ACKs by slot index, followed by ordering the sidelink HARQ-ACKs by pool index (e.g., the order of the sidelink HARQ-ACK codebook is determined (and/or derived) as slot index first, followed by pool index). In an example that is shown in FIG. 6, sidelink HARQ-ACK in PSFCH in slot $n_u-8$ in resource pool 1 is in an initial position of the sidelink HARQ-ACK codebook, followed by sidelink HARQ-ACK in PSFCH in slot $n_u-5$ in resource pool 1, followed by sidelink HARQ-ACK in PSFCH in slot $n_u-4$ in resource pool 1, followed by sidelink HARQ-ACK in PSFCH in slot $n_u-1$ in resource pool 1, followed by sidelink HARQ-ACKs in PSFCH in slot $n_u-5$ in resource pool 2, followed by sidelink HARQ-ACKs in PSFCH in slot $n_u-2$ in resource pool 2.

Alternatively and/or additionally, sidelink HARQ-ACKs of the sidelink HARQ-ACK codebook may be ordered by initially ordering the sidelink HARQ-ACKs by pool index, followed by ordering the sidelink HARQ-ACKs by slot index (e.g., the order of the sidelink HARQ-ACK codebook is determined (and/or derived) as pool index first, followed by slot index). In an example (not shown in FIG. 6), sidelink HARQ-ACK in PSFCH in slot $n_u-8$ in resource pool 1 is in an initial position of the sidelink HARQ-ACK codebook, followed by sidelink HARQ-ACK in PSFCH in slot $n_u-5$ in resource pool 1, followed by sidelink HARQ-ACKs in PSFCH in slot $n_u-5$ in resource pool 2, followed by sidelink HARQ-ACK in PSFCH in slot $n_u-4$ in resource pool 1, followed by sidelink HARQ-ACKs in PSFCH in slot $n_u-2$ in resource pool 2, followed by sidelink HARQ-ACK in PSFCH in slot $n_u-1$ in resource pool 1.

In some examples, each sidelink resource pool is associated with a sidelink assignment index or a sidelink assignment counter. In some examples, the sidelink assignment index or the sidelink assignment counter counts sidelink grant, PSCCH or PSSCH of PSFCH transmission or reception in a sidelink resource pool associated with the sidelink assignment index. In an example with respect to FIG. 6, resource pool 1 is associated with a first sidelink assignment index and resource pool 2 is associated with a second sidelink assignment index.

In some examples, the first sidelink assignment index increases if (and/or when) a first sidelink grant monitoring occasion for scheduling one or more resources in resource pool 1 changes to a second sidelink grant monitoring occasion (e.g., a next sidelink grant monitoring occasion) for scheduling one or more resources in resource pool 1 (e.g., the first sidelink assignment index may increase in response to occurrence of the second sidelink grant monitoring occasion following occurrence of the first sidelink grant monitoring occasion). In some examples, the first sidelink assignment index does not increase if (and/or when) a monitoring occasion for scheduling one or more resources in one resource pool changes to another monitoring occasion for scheduling one or more resources in a different resource pool (e.g., the first sidelink assignment index associated with resource pool 1 does not increase if (and/or when) a first sidelink grant monitoring occasion for scheduling one or more resources in resource pool 1 changes to a second sidelink grant monitoring occasion for scheduling one or more resources in resource pool 2). For example, the first sidelink assignment index may not increase due to and/or in response to occurrence of the second sidelink grant monitoring occasion following occurrence of the first sidelink grant monitoring occasion if the second sidelink grant monitoring occasion and the first sidelink grant monitoring occasion are associated with different resource pools.

Alternatively and/or additionally, the first sidelink assignment index may increase if (and/or when) a first PSFCH monitoring occasion in resource pool 1 changes to a second PSFCH monitoring occasion (e.g., a next PSFCH monitoring occasion) in resource pool 1 (e.g., the first sidelink assignment index may increase in response to occurrence of the second PSFCH monitoring occasion following occurrence of the first PSFCH monitoring occasion). In some examples, the first sidelink assignment index does not increase if (and/or when) a monitoring occasion in one resource pool changes to another monitoring occasion in a different resource pool (e.g., the first sidelink assignment index associated with resource pool 1 does not increase if (and/or when) a first PSFCH monitoring occasion associated with resource pool 1 changes to a second PSFCH monitoring occasion in resource pool 2, such as when the second PSFCH monitoring occasion in resource pool 2 occurs after occurrence of the first PSFCH monitoring occasion in resource pool 1). For example, the first sidelink assignment index may not increase due to and/or in response to occurrence of the second PSFCH monitoring occasion following occurrence of the first PSFCH monitoring occasion if the second PSFCH monitoring occasion and the first PSFCH monitoring occasion are associated with different resource pools.

Alternatively and/or additionally, the first sidelink assignment index may increase if (and/or when) a first transmission occasion (e.g., a PSSCH and/or PSCCH transmission occasion) in resource pool 1 changes to a second transmission occasion (e.g., a next transmission occasion, such as a PSSCH and/or PSCCH transmission occasion) in resource pool 1 (e.g., the first sidelink assignment index may increase in response to occurrence of the second transmission occasion following occurrence of the first transmission occasion). In some examples, the first sidelink assignment index does not increase if (and/or when) a transmission occasion in one resource pool changes to another transmission occasion in a different resource pool. For example, the first sidelink assignment index may not increase due to and/or in response to occurrence of the second transmission occasion following occurrence of the first transmission occasion if the second transmission occasion and the first transmission occasion are associated with different resource pools.

The first UE (e.g., a TX UE) may generate the sidelink HARQ-ACK codebook based upon sidelink assignment index associated with each sidelink resource pool (e.g., the first UE may generate the sidelink HARQ-ACK codebook based upon the first sidelink assignment index associated with resource pool 1 and the second sidelink assignment index associated with resource pool 2). In some examples, information of the sidelink HARQ-ACK codebook is arranged based upon the first sidelink assignment index and the second sidelink assignment index. In some examples, the sidelink HARQ-ACK codebook is generated as monitoring occasions associated with the first sidelink assignment index followed by monitoring occasions associated with the second sidelink assignment index. In an example, if a monitoring occasion is without PSSCH transmission, the UE may not increase the first sidelink assignment index (e.g., the UE does not increase the first sidelink assignment index due to and/or in response to the monitoring occasion without PSSCH transmission).

In an example with respect to FIG. 6, the first sidelink assignment index (associated with resource pool 1) would increase from slot $n_u-8$ to $n_u-5$ (such as due to occurrence of a PSFCH monitoring occasion in slot $n_u-5$ in resource pool 1 following occurrence of a PSFCH monitoring occasion in slot $n_u-8$ in resource pool 1), increase from slot $n_u-5$ to $n_u-4$ (such as due to occurrence of a PSFCH monitoring occasion in slot $n_u-4$ in resource pool 1 following occurrence of a PSFCH monitoring occasion in slot $n_u-5$ in resource pool 1) and/or increase from slot $n_u-4$ to $n_u-1$ (such as due to occurrence of a PSFCH monitoring occasion in slot $n_u-1$ in resource pool 1 following occurrence of a PSFCH monitoring occasion in slot $n_u-4$ in resource pool 1). The first sidelink assignment index does not increase when slot $n_u-2$ occurs (such as due to slot $n_u-2$ belonging to sidelink resource pool 2 and/or due to a PSFCH monitoring occasion in slot $n_u-2$ being in resource pool 2, rather than resource pool 1). In some examples, the second sidelink assignment index increases by 2 from slot $n_u-5$ to $n_u-2$. In the example with respect to FIG. 6, an increase of a sidelink assignment index from slot x to slot y corresponds to the sidelink assignment index increasing when, once, upon and/or in response to occurrence of the slot y.

In FIG. 5, slots that belong to a sidelink resource pool are shown as pattern-filled slots and PSFCH regions are shown as black rectangles within some of the pattern-filled slots. A sidelink resource pool in this example is configured with a periodicity of N=2. Accordingly, each set of 2 sidelink slots in the sidelink resource pool comprises a PSFCH region and/or PSFCH resource (e.g., a PSFCH region and/or PSFCH resource exists in every 2nd slot in the sidelink resource pool). In this example, one or more PSFCH resources (e.g., two PSFCH resources comprising PSFCH 1 and PSFCH 2) in slot $n_u-2$ is associated with sidelink HARQ-ACK for sidelink transmission in two preceding slots in the sidelink resource pool. For example, the two preceding slots may correspond to two most recent slots in the sidelink resource pool that precede slot $n_u-2$. For example, the two preceding slots comprise a slot (e.g., slot $n_u-4$) in the sidelink resource pool that precedes slot $n_u-2$ by one slot in the sidelink resource pool (e.g., slot $n_u-4$ precedes slot $n_u-2$ by one patterned filled slot as shown in FIG. 5) and a slot (e.g., slot $n_u-5$) in the sidelink resource pool that precedes slot $n_u-2$ by two slots in the sidelink resource pool (e.g., slot $n_u-5$ precedes slot $n_u-2$ by two patterned filled slot as shown in FIG. 5). The first UE (e.g., a TX UE) may be configured with a set of time offsets (e.g., PSFCH to PUCCH offset={1, 2, 3, 4, 5, 6, 7, 8}). In some examples, an association set 502 is based upon the set of time offsets (e.g., the association set 502 may comprise slots $n_u-1, n_u-2, n_u-3, n_u-4, n_u-5, n_u-6, n_u-7$ and $n_u-8$ based upon the set of time offsets comprising 1, 2, 3, 4, 5, 6, 7 and 8, respectively). The first UE receives a first sidelink grant (or DCI) in slot m. The first sidelink grant indicates a first sidelink resource in slot $n_u-5$ (e.g., the first sidelink grant may indicate the first sidelink resource in slot $n_u-5$ to the first UE). The first UE may perform a first sidelink transmission in slot $n_u-5$ to a first RX UE. The first UE receives a first sidelink HARQ-ACK associated with the first sidelink transmission (e.g., the first sidelink HARQ-ACK may indicate whether or not the first sidelink transmission is successfully received by the first RX UE). The first sidelink HARQ-ACK may be received in PSFCH 1 in slot $n_u-2$. The first UE receives the first sidelink HARQ-ACK from the first RX UE. Based upon a time offset indicated by the first sidelink grant (e.g., the time offset may be "2" from the set of time offsets), the first UE may determine (and/or derive) a slot and/or a time of a PUCCH for delivering the first sidelink HARQ-ACK based upon PSFCH 1. In this example, the first UE would determine to transmit the PUCCH, for delivering the first sidelink HARQ-ACK, in slot $n_u$ (e.g., the first UE may derive slot $n_u$ for transmission of the PUCCH based upon PSFCH 1 being comprised in the slot $n_u-2$ and based upon the time offset of 2 from the set of time offsets, such as by determining that slot $n_u$ is 2 slots after slot $n_u-2$). The first UE may receive a second sidelink grant in slot m+1. The second sidelink grant indicates a second sidelink resource in slot $n_u-4$ (e.g., the second sidelink grant may indicate the second sidelink resource in slot $n_u-4$ to the first UE). The first UE may perform a second sidelink transmission in slot $n_u-4$ to a second RX UE. The first RX UE may be the same as or different from the second RX UE. The first UE receives a second sidelink HARQ-ACK associated with the second sidelink transmission (e.g., the second sidelink HARQ-ACK may indicate whether or not the second sidelink transmission is successfully received by the second RX UE). The second sidelink HARQ-ACK may be received in PSFCH 2 in slot $n_u-2$. The first UE receives the second sidelink HARQ-ACK from the second RX UE. Based upon a time offset indicated by the second sidelink grant (e.g., the time offset may be "2" from the set of time offsets), the first UE may determine (and/or derive) a slot and/or a time of a PUCCH for delivering the second sidelink HARQ-ACK based upon PSFCH 2. In this example, the first UE would determine to transmit the PUCCH, for delivering the second sidelink HARQ-ACK, in slot $n_u$ (e.g., the first UE may derive slot $n_u$ for transmission of the PUCCH based upon PSFCH 2 being contained in the slot $n_u-2$ and based upon the time offset of 2 from the set of time offsets, such as by determining that slot $n_u$ is 2 slots after slot $n_u-2$). The first UE would derive (and/or generate) a sidelink HARQ-ACK codebook comprising (and/or indicating) two occasions associated with slot $n_u-5$ and two occasions associated with slot $n_u-2$. The first UE may not count slots, associated with time offset values different than 2 and 5, as occasions (such as because the first UE does not expect to receive sidelink HARQ-ACK (e.g., any sidelink HARQ-ACK) in slots associated with time offset values different than 2 and 5). The first UE would generate (and/or derive) the sidelink HARQ-ACK codebook by counting slot $n_u-5$ as two occasions and slot $n_u-2$ as two occasions. In some examples, two occasions for a counted slot is because N=2 and/or because a PSFCH region and/or resource in a slot of the sidelink resource pool is associated with 2 sidelink slots of the sidelink resource pool. In other words, the first UE determines that a first number of occasions, corresponding to a sidelink HARQ-ACK codebook size of the sidelink HARQ-ACK codebook, is 4. In some examples, the sidelink HARQ-ACK codebook size is equal to the first number of occasions (e.g., 4). The sidelink HARQ-ACK codebook comprises sidelink HARQ-ACK bits, such as comprising one or more first sidelink HARQ-ACK bits (such as one bit) corresponding to sidelink HARQ-ACK for a first occasion in $n_u-5$, one or more second sidelink HARQ-ACK bits (such as one bit) corresponding to sidelink HARQ-ACK for a second occasion in $n_u-5$, one or more third sidelink HARQ-ACK bits (such as one bit) corresponding to sidelink HARQ-ACK for a first occasion in $n_u-2$, and one or more fourth sidelink HARQ-ACK bits (such as one bit) corresponding to sidelink HARQ-ACK for a second occasion in $n_u-2$. In this example, if the first UE does not receive information (such as any sidelink HARQ-ACK feedback) in a PSFCH region in slot $n_u-5$, the first UE may determine (and/or derive) that sidelink HARQ-ACK for the first occasion in slot $n_u-5$ and sidelink HARQ-ACK for the second occasion in slot $n_u-5$ are NACK (e.g., the one or more first bits and/or the one or more second bits of the sidelink HARQ-ACK codebook may indicate "0", which may be indicative of NACK). The first UE may determine (and/or derive) sidelink HARQ-ACK for the first occasion in slot $n_u-2$ and sidelink HARQ-ACK for the second occasion in slot $n_u-2$ based upon content of PSFCH 1 and content of PSFCH 2, respectively. In some examples, content of PSFCH 1 (received from the first RX UE) and content of PSFCH 2 (received from the second RX UE) may be ACK, NACK or Discontinous Transmission (DTX) (e.g., DTX may correspond to not receiving information, corresponding to PSFCH 1 and/or PSFCH 2, in the PSFCH region of slot $n_u-2$). In some examples, if an occasion in slot $n_u-2$ (such as indicated by content of PSFCH 1 or PSFCH 2) corresponds to NACK and/or DTX, the first UE determines (and/or derives) that the sidelink HARQ-ACK for the occasion is NACK (e.g., the first UE considers the sidelink HARQ-ACK for the occasion to be NACK). In some examples, if an occasion in slot $n_u-2$ (such as indicated by content of PSFCH 1 or PSFCH 2) corresponds to ACK, the first UE determines (and/or derives) that the sidelink HARQ-ACK for the occasion is ACK (e.g., the first UE considers the sidelink HARQ-ACK for the occasion to be ACK).

Figure 7:
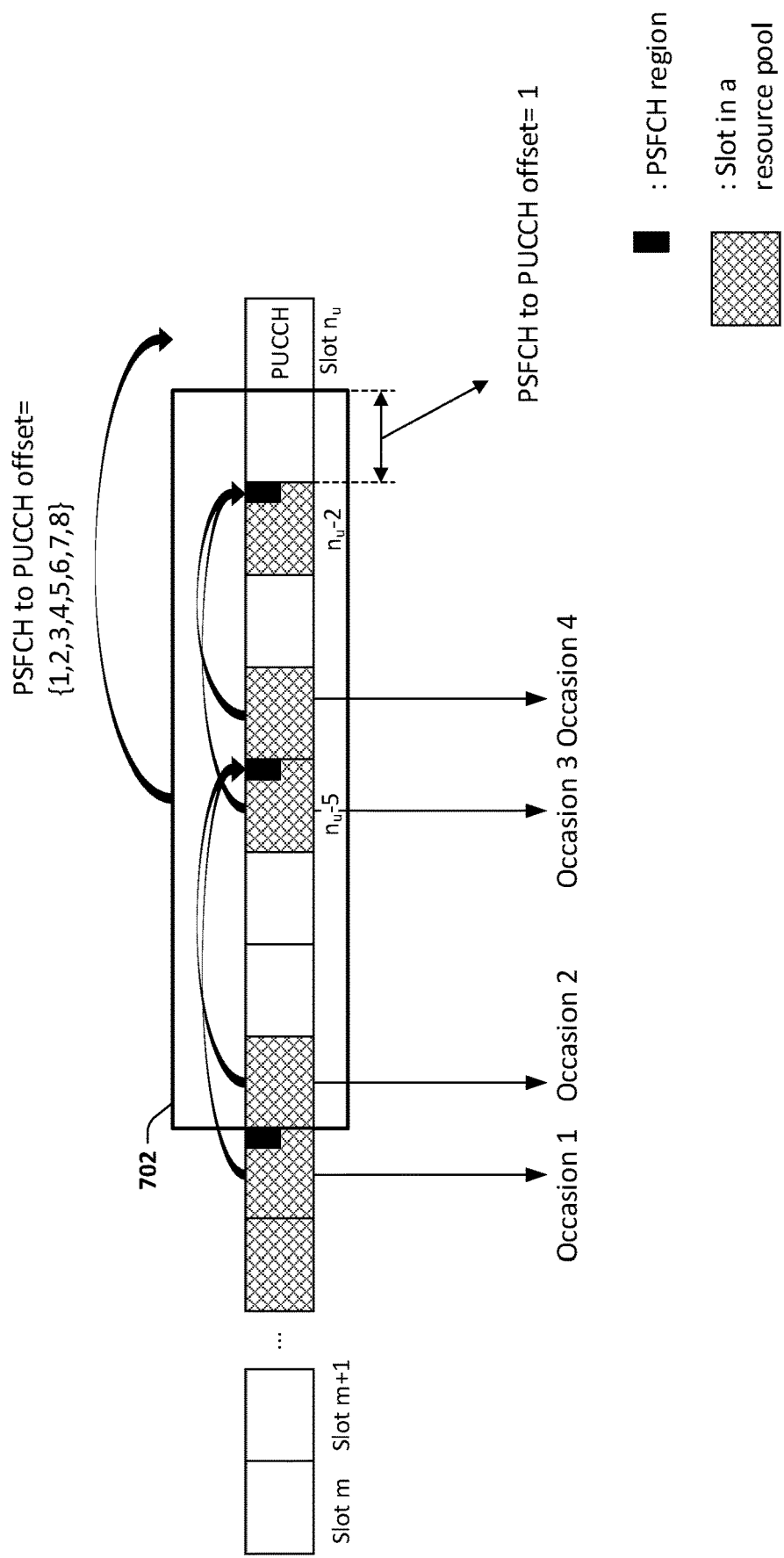
FIG. 7 is a diagram illustrating an exemplary scenario associated with sidelink HARQ-ACK according to one exemplary embodiment.

FIG. 7 illustrates an exemplary scenario associated with sidelink HARQ-ACK according to some embodiments. In some examples, the first UE (e.g., a TX UE) determines a first number of occasions based upon one or more slots, that are each for transmitting sidelink transmission (such as pattern-filled slots shown in FIG. 7) and that are each associated with a PSFCH slot that is in an association set 702. One or more PSFCH regions (shown as black rectangles within some of the pattern-filled slots in FIG. 7) of one or more slots in the association set 702, are used and/or configured for receiving sidelink HARQ-ACK feedback associated with each slot of the one or more slots based upon which the first number of occasions is determined. In this example, sidelink HARQ-ACK of occasion 1 and sidelink HARQ-ACK of occasion 2 are associated with a PSFCH region in slot $n_u-5$, and sidelink HARQ-ACK of occasion 3 and sidelink HARQ-ACK of occasion 4 are associated with a PSFCH region in slot $n_u-2$. Accordingly, due to the slot corresponding to occasion 1 being a slot for sidelink transmission, and the slot corresponding to occasion 1 being associated with a PSFCH region in slot $n_u-5$ (which is in the association set 702), the slot corresponding to occasion 1 is included in the one or more slots based upon which the first number of occasions is determined (and/or occasion 1 is counted in determining the first number of occasions). Similarly, slots corresponding to occasions 2, 3 and 4 may also be included in the one or more slots based upon which the first number of occasions is determined (and/or occasions 2, 3 and 4 may be counted in determining the first number of occasions). The first UE determines that the first number of occasions is 4. The first number of occasions may be 4 based upon a determination that a quantity of the one or more slots is 4. Alternatively and/or additionally, the first number of occasions may be 4 based upon a determination that a quantity of one or more occasions associated with the one or more slots (e.g., occasion 1, occasion 2, occasion 3 and occasion 4) is 4. The sidelink HARQ-ACK codebook size would be 4 (e.g., equal to the first number of occasions). In some examples, an occasion among the one or more occasions (and/or a slot among the one or more slots) may be within the association set 702 or outside the association set 702 (e.g., an occasion of the one or more occasions, such as occasion 1, may be earlier than the association set 702).

Figure 8:
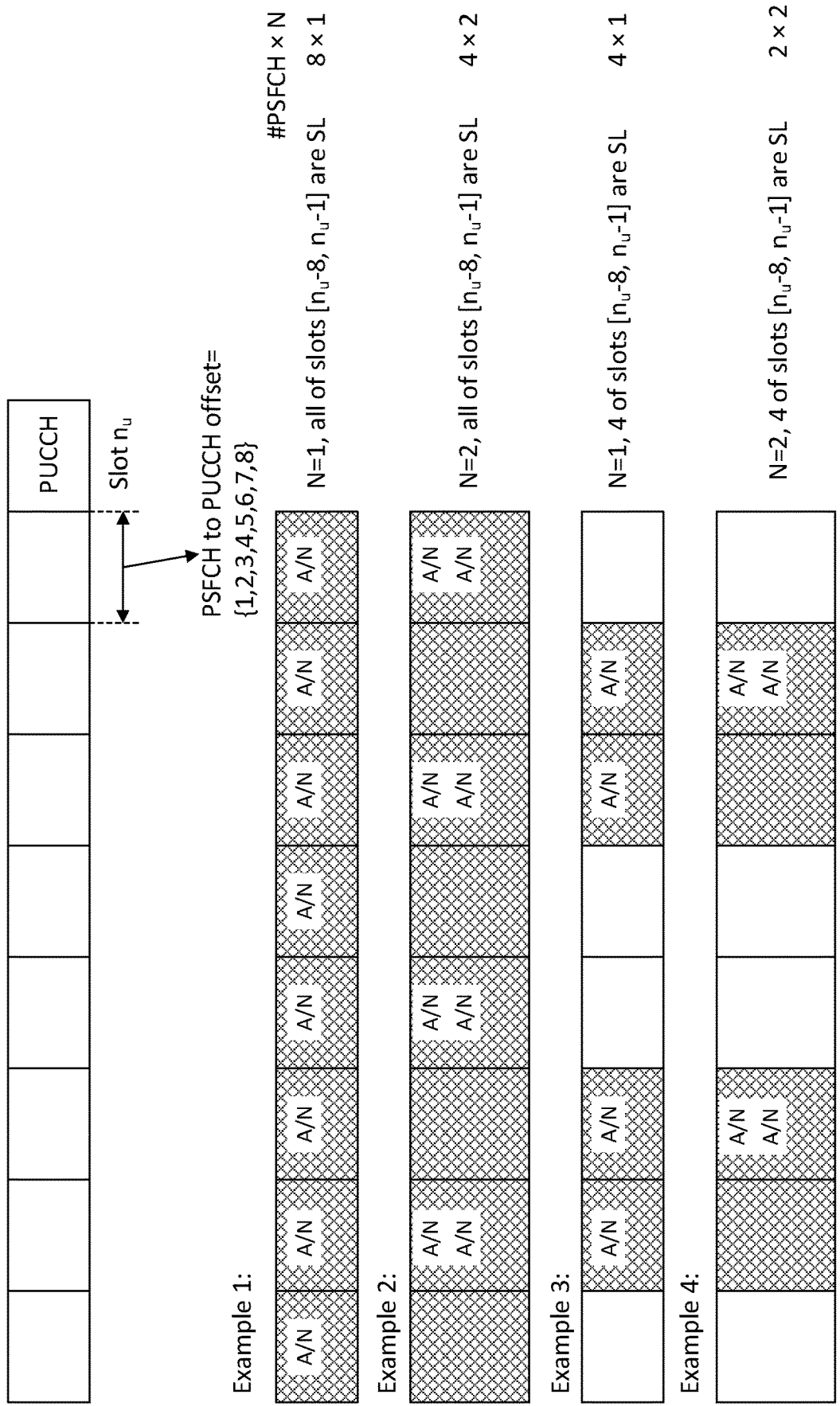
FIG. 8 is a diagram illustrating an exemplary scenario associated with sidelink HARQ-ACK according to one exemplary embodiment.

FIG. 8 illustrates an exemplary scenario associated with sidelink HARQ-ACK according to some embodiments. FIG. 8 illustrates four examples for generating sidelink HARQ-ACK codebooks, with respect to a set of time offsets {1, 2, 3, 4, 5, 6, 7, 8}. An association set may comprise slots [$n_u$–8, $n_u$–1] based upon the set of time offsets {1, 2, 3, 4, 5, 6, 7, 8}. One PSFCH resource corresponds to one "A/N" in FIG. 8. In example 1, a PSFCH periodicity is N=1 and 8 slots belong to a sidelink resource pool (e.g., all slots in slots [$n_u$–8, $n_u$–1] are sidelink slots of the sidelink resource pool). In example 1, a sidelink HARQ-ACK codebook size of a sidelink HARQ-ACK codebook (such as transmitted via PUCCH in slot $n_u$) is 8 (e.g., the sidelink HARQ-ACK codebook size is equal to a product of N (such as 1) and a quantity (such as 8) of slots that each comprise a PSFCH region for sidelink HARQ-ACK and that each belong to the sidelink resource pool).

In example 2, a PSFCH periodicity is N=2 and 8 slots belong to a sidelink resource pool (e.g., all slots in slots [$n_u$–8, $n_u$–1] are sidelink slots of the sidelink resource pool). In example 2, a sidelink HARQ-ACK codebook size of a sidelink HARQ-ACK codebook (such as transmitted via PUCCH in slot $n_u$) is 8 (e.g., the sidelink HARQ-ACK codebook size is equal to a product of N (such as 2) and a quantity (such as 4) of slots that each comprise a PSFCH region for sidelink HARQ-ACK and that each belong to the sidelink resource pool).

In example 3, a PSFCH periodicity is N=1 and 4 slots belong to a sidelink resource pool (e.g., 4 slots in slots [$n_u$–8, $n_u$–1] are sidelink slots of the sidelink resource pool). In example 3, a sidelink HARQ-ACK codebook size of a sidelink HARQ-ACK codebook (such as transmitted via PUCCH in slot $n_u$) is 4 (e.g., the sidelink HARQ-ACK codebook size is equal to a product of N (such as 1) and a quantity (such as 4) of slots that each comprise a PSFCH region for sidelink HARQ-ACK and that each belong to the sidelink resource pool).

In example 4, a PSFCH periodicity is N=2 and 4 slots belong to a sidelink resource pool (e.g., 4 slots in slots [$n_u$–8, $n_u$–1] are sidelink slots of the sidelink resource pool). In example 4, a sidelink HARQ-ACK codebook size of a sidelink HARQ-ACK codebook (such as transmitted via PUCCH in slot $n_u$) is 4 (e.g., the sidelink HARQ-ACK codebook size is equal to a product of N (such as 2) and a quantity (such as 2) of slots that each comprise a PSFCH region for sidelink HARQ-ACK and that each belong to the sidelink resource pool).

With respect to one or more embodiments herein, in some examples, PSFCH slot "$n_f$" may be replaced by PSSCH slot "$n_s$", PDSCH "$n_D$", or PDCCH slot "$n_D$".

With respect to one or more embodiments herein, in some examples, k1' may correspond to a slot offset that corresponds to a number of physical slots from a PSSCH slot "$n_s$" to an uplink slot "$n_u$" (e.g., in an example where the PSSCH slot is slot "$n_u$–x", the slot offset may be x).

With respect to one or more embodiments herein, in some examples, k1' may correspond to a slot offset that corresponds to a number of physical slots from a slot "$n_D$" to an uplink slot "$n_u$" (e.g., in an example where "$n_D$" is "$n_u$–x", the slot offset may be x). The slot "$n_D$" may be a PDSCH or a PDCCH slot.

With respect to one or more embodiments herein, in some examples, the PSFCH periodicity is larger than 1 slot.

With respect to one or more embodiments herein, in some examples, the PSFCH periodicity is N=2 (e.g., 2 slots) or N=4 (e.g., 4 slots).

With respect to one or more embodiments herein, in some examples, for a sidelink resource pool, not every slot in the sidelink resource pool comprises a PSFCH resource.

With respect to one or more embodiments herein, in some examples, for a sidelink resource pool, one slot comprising a PSFCH resource is associated with one or more sidelink transmissions in 2 slots (if N=2) or 4 slots (if N=4), or a different number of slots equal to N (e.g., PSFCH periodicity).

With respect to one or more embodiments herein, in some examples, the first UE may be a vehicle UE, a pedestrian UE and/or a TX UE performing sidelink transmission.

With respect to one or more embodiments herein, in some examples, the network may be a gNB, an eNB, a base station, a network node and/or a TRP.

With respect to one or more embodiments herein, in some examples, the sidelink transmission may be transmitted via PC5 interface.

With respect to one or more embodiments herein, in some examples, the sidelink transmission is transmitted via PSSCH.

With respect to one or more embodiments herein, in some examples, the first UE is configured (e.g., pre-configured) to perform sidelink transmission based upon scheduling from the network.

With respect to one or more embodiments herein, in some examples, a sidelink transmission being unicast may imply that only a peer device (e.g., a peer of the first UE) and/or a paired device (e.g., a device paired with the first UE) can successfully receive and/or decode the sidelink transmission.

With respect to one or more embodiments herein, in some examples, a sidelink transmission being unicast may imply that the sidelink transmission includes and/or indicates an ID (e.g., L1/L2-destination ID) for the peer device and/or the paired device.

With respect to one or more embodiments herein, in some examples, a sidelink transmission being groupcast may imply that only devices in a group (e.g., a sidelink group) can successfully receive and/or decode the sidelink transmission.

With respect to one or more embodiments herein, in some examples, a sidelink transmission being unicast may imply that the sidelink transmission includes and/or indicates an ID for the group.

One, some and/or all of the foregoing techniques and/or embodiments can be formed to a new embodiment.

In some examples, embodiments disclosed herein may be implemented independently and/or separately. Alternatively and/or additionally, a combination of embodiments described herein may be implemented. Alternatively and/or additionally, a combination of embodiments described herein may be implemented concurrently and/or simultaneously.

Various methods and/or techniques of the present disclosure may be performed independently and/or separately from one another. Alternatively and/or additionally, various methods and/or techniques of the present disclosure may be combined and/or implemented using a single system. Alternatively and/or additionally, various methods and/or techniques of the present disclosure may be implemented concurrently and/or simultaneously.

Figure 9:
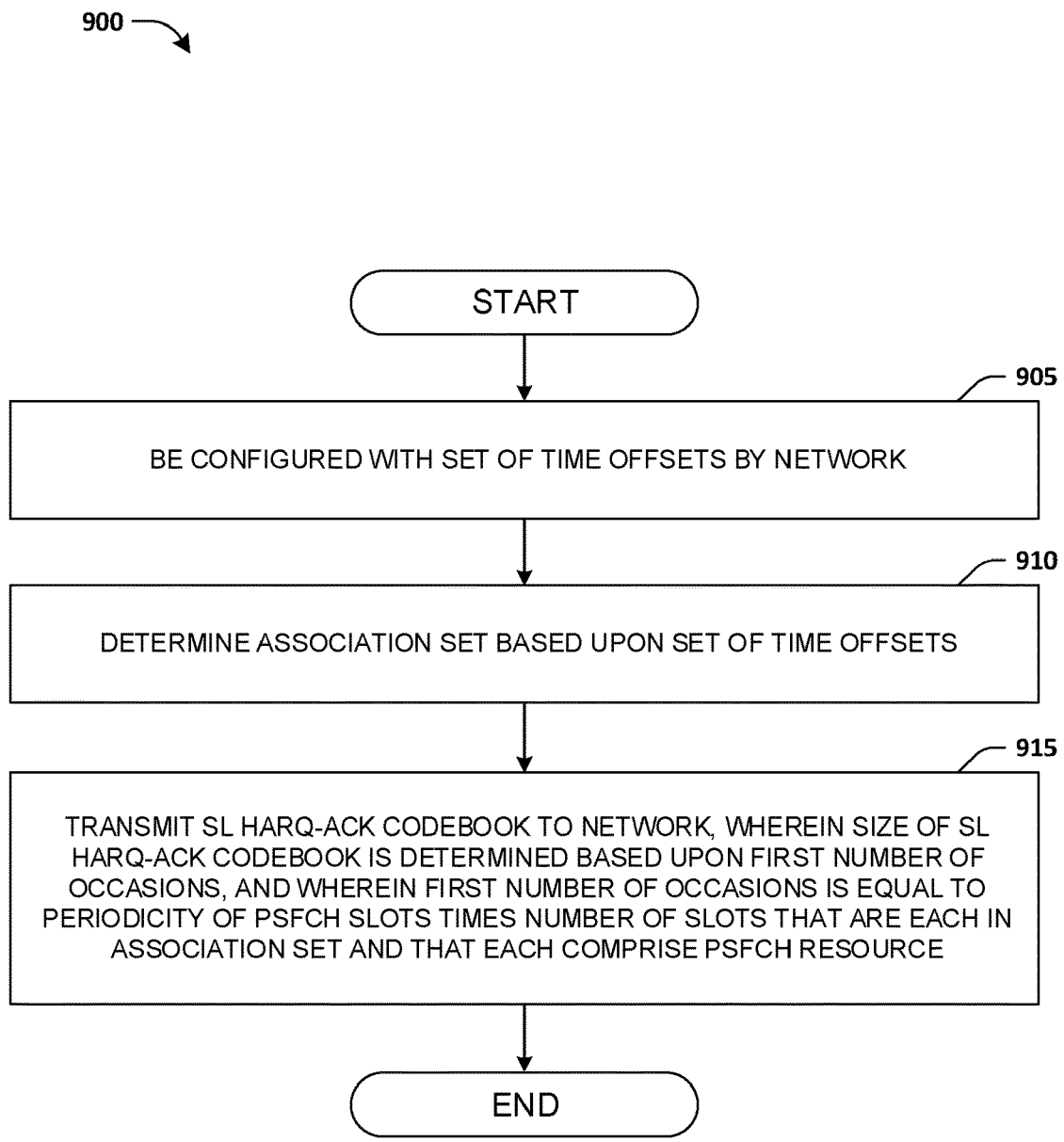
FIG. 9 is a flow chart according to one exemplary embodiment.

FIG. 9 is a flow chart 900 according to one exemplary embodiment for transmitting a sidelink HARQ-ACK codebook in a slot $n_u$ from the perspective of a first UE. In step 905, the first UE is configured with a set of time offsets by a network. In step 910, the first UE determines (and/or derives) an association set based upon the set of time offsets. In step 915, the first UE transmits, in slot $n_u$, the sidelink HARQ-ACK codebook to a network, wherein a size of the sidelink HARQ-ACK codebook is determined (and/or derived) based upon a first number of occasions, and wherein the first number of occasions is equal to product of a periodicity of PSFCH slots and a number of slots that are each in the association set and that each comprise a PSFCH resource.

In one embodiment, each time offset (e.g., k1') in the set of time offsets corresponds to a number of physical slots from a PSFCH slot "$n_f$" to an uplink slot "$n_u$".

In one embodiment, the periodicity of PSFCH slots is configured (e.g., pre-configured) for a sidelink resource pool.

In one embodiment, one or more slots in the sidelink resource pool comprise one or more PSFCH resources in accordance with the periodicity of PSFCH slots. In an example where the periodicity of PSFCH slots is N, each set of N slots in the sidelink resource pool comprises a PSFCH resource (e.g., every Nth slot in the sidelink resource pool comprises a PSFCH resource).

In one embodiment, the first number of occasions may be determined (and/or derived) based upon a number of slots (e.g., possible slots) that each comprise (and/or potentially comprise) a PSCCH resource and/or a PSSCH resource associated with a slot comprising a PSFCH resource which is in the association set (e.g., sidelink HARQ-ACK feedback may be received via the PSFCH resource, wherein the sidelink HARQ-ACK feedback is associated with a sidelink transmission performed using the PSCCH resource and/or the PSSCH resource).

In one embodiment, the sidelink HARQ-ACK codebook comprises sidelink HARQ-ACK feedback associated with one or more sidelink transmissions that are transmitted by the first UE in the sidelink resource pool with the periodicity of PSFCH slots. In some examples, the sidelink HARQ-ACK feedback is determined based upon receptions (e.g., sidelink HARQ-ACK receptions) in one or more slots, wherein each slot of the one or more slots comprise a PSFCH resource.

In one embodiment, the sidelink HARQ-ACK codebook comprises sidelink HARQ-ACK feedback associated with one or more sidelink transmissions, that are transmitted by the first UE, in a single sidelink resource pool (e.g., each sidelink transmission of the one or more sidelink transmissions is in the same sidelink resource pool).

In one embodiment, the sidelink HARQ-ACK codebook does not comprise and/or multiplex sidelink HARQ-ACK feedback associated with sidelink transmissions, that are transmitted by the first UE, in different sidelink resource pools (e.g., the sidelink HARQ-ACK codebook may not comprise sidelink HARQ-ACK feedback associated with sidelink transmissions if all of the sidelink transmissions are not in the same sidelink resource pool, i.e., the sidelink HARQ-ACK codebook may comprise sidelink HARQ-ACK feedback associated with one or more sidelink transmissions in a single sidelink resource pool).

In one embodiment, the sidelink HARQ-ACK codebook comprises sidelink HARQ-ACK feedback associated with sidelink transmissions, that are transmitted by the first UE, in multiple sidelink resource pools (such as where at least one sidelink transmission of the sidelink transmissions is performed in a first sidelink resource pool and at least one sidelink transmission of the sidelink transmissions is performed in a second sidelink resource pool different than the first sidelink resource pool), wherein the multiple sidelink resource pools are configured (e.g., pre-configured) with the same periodicity of PSFCH slots.

In one embodiment, the sidelink HARQ-ACK codebook does not comprise and/or multiplex sidelink HARQ-ACK feedback associated with sidelink transmissions, that are transmitted by the first UE, in multiple sidelink resource pools (such as where at least one sidelink transmission of the sidelink transmissions is performed in a first sidelink resource pool and at least one sidelink transmission of the sidelink transmissions is performed in a second sidelink resource pool different than the first sidelink resource pool), wherein the multiple sidelink resource pools are configured (e.g., pre-configured) with different periodicities of PSFCH slots (e.g., the sidelink HARQ-ACK codebook may not comprise sidelink HARQ-ACK feedback associated with the sidelink transmissions in the multiple sidelink resource pools if the multiple sidelink resource pools are not configured with the same periodicity of PSFCH slots).

In one embodiment, a second UE (e.g., a paired UE, such as paired with the first UE) transmits a sidelink HARQ-ACK in one occasion among one or more first occasions, wherein the first number of occasions is a number of occasions of the one or more first occasions.

In one embodiment, the sidelink HARQ-ACK from the second UE is in response to a sidelink transmission (e.g., a unicast sidelink transmission) transmitted by the first UE.

In one embodiment, the first UE transmits a sidelink transmission (e.g., a unicast sidelink transmission) on a resource, wherein the resource is scheduled by the network.

In one embodiment, the set of time offsets is configured by dedicated signaling (e.g., dedicated RRC signaling).

Referring back to FIGS. 3 and 4, in one exemplary embodiment of a first UE, the device 300 includes a program code 312 stored in the memory 310. The CPU 308 could execute program code 312 to enable the first UE (i) to be configured with a set of time offsets by a network, (ii) to determine an association set based upon the set of time offsets, and (iii) to transmit, in slot $n_u$, the sidelink HARQ-ACK codebook to a network, wherein a size of the sidelink HARQ-ACK codebook is determined based upon a first number of occasions, and wherein the first number of occasions is equal to a periodicity of PSFCH slots times a number of slots that are each in the association set and that each comprise a PSFCH resource. Furthermore, the CPU 308 can execute the program code 312 to perform one, some and/or all of the above-described actions and steps and/or others described herein.

Figure 10:
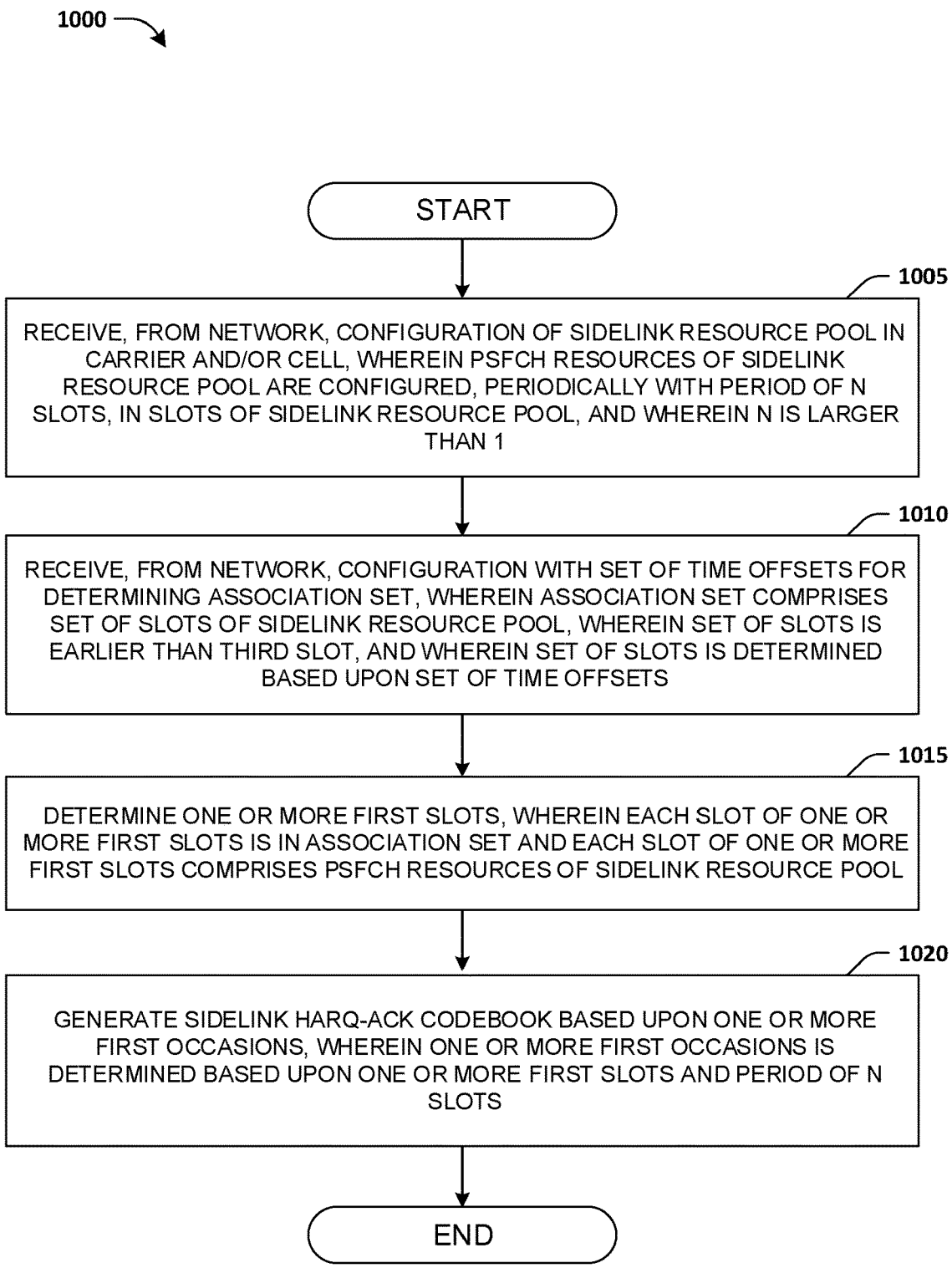
FIG. 10 is a flow chart according to one exemplary embodiment.

FIG. 10 is a flow chart 1000 according to one exemplary embodiment for transmitting a sidelink HARQ-ACK codebook to a network in a third slot (e.g., slot $n_u$) from the perspective of a first UE. In step 1005, the first UE receives, from the network, a configuration of a sidelink resource pool in a carrier and/or a cell. PSFCH resources of the sidelink resource pool are configured, periodically with a period of N slots, in slots of the sidelink resource pool. In an example, each set of N slots, of the sidelink resource pool, comprises one slot comprising a PSFCH resource of the sidelink resource pool (e.g., every Nth slot of the sidelink resource pool comprises a PSFCH resource of the sidelink resource pool). N is larger than 1. In step 1010, the first UE receives, from the network, a configuration with a set of time offsets for determining an association set. The association set comprises a set of slots of the sidelink resource pool. The set of slots is earlier than (e.g., before) the third slot. The set of slots is determined (and/or derived) based upon the set of time offsets. In step 1015, the first UE determines (and/or derives) one or more first slots, wherein each slot of the one or more first slots is in the association set and each slot of the one or more first slots comprises PSFCH resources of the sidelink resource pool. In an example, the one or more first slots corresponds to a number of slots that are in the association set and that comprise a PSFCH resource of the sidelink resource pool. In step 1020, the first UE generates the sidelink HARQ-ACK codebook based upon one or more first occasions. The one or more first occasions is determined (and/or derived) based upon the one or more first slots and the period of N slots.

In one embodiment, a slot of the one or more first slots is counted as N occasions in determining or deriving the one or more first occasions (e.g., when determining or deriving the one or more first occasions, the first UE counts N occasions for one slot, in the association set, that comprises one or more PSFCH resources of the sidelink resource pool). In one embodiment, a slot, in the association set, that does not comprise PSFCH resource of the sidelink resource pool is not counted as any occasion (e.g., is counted as 0 occasions) in determining or deriving the one or more first occasions (e.g., when determining or deriving the one or more first occasions, the first UE does not count any occasion for a slot, in the association set, that does not comprise a PSFCH resource of the sidelink resource pool).

In one embodiment, a first number of the one or more first occasions is determined (and/or derived) based upon a product of a first number of the one or more first slots and N (e.g., N×first number of the one or more first slots). In one embodiment, a first number of the one or more first occasions is equal to the product of a first number of the one or more first slots and N. In one embodiment, a size of the sidelink HARQ-ACK codebook corresponds to a first number of the one or more first occasions (e.g., the first number of the one or more first occasions may be equal to a number of bits of the sidelink HARQ-ACK codebook and/or the first number of the one or more first occasions may be equal to a number of sidelink HARQ-ACKs indicated by the sidelink HARQ-ACK codebook). In one embodiment, the size of the sidelink HARQ-ACK codebook corresponds to the product of a first number of the one or more first slots and N (e.g., the product of the first number of the one or more first slots and N may be equal to a number of bits of the sidelink HARQ-ACK codebook and/or the product of the first number of the one or more first slots and N may be equal to a number of sidelink HARQ-ACKs indicated by the sidelink HARQ-ACK codebook).

In one embodiment, PSFCH resources in a fourth slot of the one or more first slots are associated with sidelink resources for sidelink data transmissions in a plurality of slots of the sidelink resource pool, wherein a number of slots of the plurality of slots is equal to N and each slot of the plurality of slots comprises sidelink resources for sidelink data transmission. In one embodiment, an association between the fourth slot of the one or more first slots and the plurality of slots is configured (e.g., pre-configured) and/or specified for the sidelink resource pool. In one embodiment, the fourth slot of the one or more first slots comprises a set of PSFCH resources, wherein the set of PSFCH resources comprises N subsets of PSFCH resources. In one embodiment, each subset of PSFCH resources of the N subsets of PSFCH resources is utilized for transmission of sidelink HARQ-ACK feedback associated with a sidelink data transmission in a slot of the plurality of slots (e.g., each subset of PSFCH resources of the N subsets of PSFCH resources is associated with receiving sidelink HARQ-ACK feedback in response to sidelink data transmission of each slot of the plurality of slots, respectively). In one embodiment, an occasion of the one or more first occasions is associated with a subset of PSFCH resources of the sidelink resource pool. In one embodiment, an occasion of the one or more first occasions is associated with sidelink HARQ-ACK feedback associated with a sidelink data transmission in a slot of the plurality of slots.

In one embodiment, the first UE determines (and/or derives) an order of the one or more first occasions. The sidelink HARQ-ACK codebook is generated based upon the order of the one or more first occasions (e.g., indications of sidelink HARQ-ACK feedback may be arranged in the sidelink HARQ-ACK codebook in accordance with the order of the one or more first occasions). The one or more first occasions comprise a plurality of sets of occasions. Each set of occasions of the plurality of sets of occasions is associated with a set of PSFCH resources in a slot of the one or more first slots. The order of the one or more first occasions corresponds to a first set of occasions of the plurality of sets of occasions being followed by a second set of occasions of the plurality of sets of occasions. The first set of occasions is associated with a first set of PSFCH resources in an earliest slot of the one or more first slots. The first set of PSFCH resources comprises N first subsets of PSFCH resources, and an occasion of the first set of occasions is associated with a first subset of PSFCH resources. The second set of occasions is associated with a second set of PSFCH resources in a slot, of the one or more first slots, after the earliest slot of the one or more first slots. The second set of PSFCH resources comprises N second subsets of PSFCH resources, and an occasion of the second set of occasions is associated with a second subset of PSFCH resources. For each set of occasions of the plurality of sets of occasions, the order of the one or more first occasions corresponds to a first occasion, of the set of occasions, associated with a second slot for sidelink data transmission being followed by a second occasion, of the set of occasions, associated with a third slot for sidelink data transmission that is after the second slot. For example, the second slot may comprise a sidelink resource for sidelink data transmission. The second occasion may be associated with a PSFCH resource for receiving sidelink HARQ-ACK feedback associated with the sidelink data transmission in the second slot. The third slot, which is after the second slot, may comprise a sidelink resource for sidelink data transmission. The third occasion, which follows the second occasion in the order of the one or more first occasions, may be associated with a PSFCH resource for receiving sidelink HARQ-ACK feedback associated with the sidelink data transmission in the second slot.

In one embodiment, the first UE receives one or more sets of PSFCH resources in a slot of the one or more first slots, wherein PSFCH resources, of a set of PSFCH resources of the one or more sets of PSFCH resources, overlap (e.g., fully overlap) in time domain and do not overlap in frequency domain. In an example, the first UE may or may not receive one or more other resources and/or information, in the slot, in addition to the one or more sets of PSFCH resources. In an example, the first UE may receive a set of sidelink HARQ-ACKs via a set of PSFCH resources.

In one embodiment, the first UE receives a DCI for scheduling one or more sidelink resources in the sidelink resource pool, wherein the DCI indicates the third slot for transmission (and/or reporting), to the network, of sidelink HARQ-ACK feedback associated with a sidelink data transmission on a sidelink resource of the one or more sidelink resources. The first UE performs the sidelink data transmission on the sidelink resource to a second UE. The first UE monitors and/or receives the sidelink HARQ-ACK feedback from the second UE in response to the sidelink data transmission (e.g., the sidelink HARQ-ACK feedback may be indicative of whether or not the second UE successfully received and/or decoded the sidelink data transmission transmitted by the first UE). In one embodiment, the sidelink HARQ-ACK feedback is transmitted (and/or delivered) by the second UE on a first PSFCH resource in a slot in the association set (e.g., the one or more first slots comprise the slot comprising the first PSFCH resource). In one embodiment, the sidelink HARQ-ACK codebook is generated based upon the sidelink HARQ-ACK feedback (and/or the sidelink HARQ-ACK codebook is generated based upon an indication of the sidelink HARQ-ACK feedback). In an example, the sidelink HARQ-ACK codebook may or may not be generated based upon other information, such as other sidelink HARQ-ACK feedback, in addition to the sidelink HARQ-ACK feedback.

In one embodiment, the sidelink HARQ-ACK feedback is on an occasion, of the one or more first occasions, associated with the first PSFCH resource (e.g., the sidelink HARQ-ACK feedback is received on and/or via the occasion of the one or more first occasions).

In one embodiment, if a sidelink data transmission in a slot of the plurality of slots is unicast, a number of PSFCH resources of a subset of PSFCH resources associated with the sidelink data transmission is one. In one embodiment, if a sidelink data transmission in a slot of the plurality of slots is groupcast, a number of PSFCH resources of a subset of PSFCH resources associated with the sidelink data transmission is at least one.

In one embodiment, in response to not receiving a subset of PSFCH resources associated with an occasion of the one or more first occasions, not receiving a DCI for scheduling a sidelink resource associated with the subset of PSFCH resources and/or not performing a sidelink data transmission associated with the occasion of the one or more first occasions, the first UE generates NACK for the occasion. In an example, the sidelink HARQ-ACK codebook is indicative of NACK for the occasion.

In one embodiment, the first UE determines to perform a PSFCH transmission and not to perform a PSFCH reception during a fourth slot of the one or more first slots. The fourth slot of the one or more first slots is counted in determining or deriving the one or more first occasions. The fourth slot of the one or more first slots is counted as N occasions in determining or deriving the one or more first occasions Referring back to FIGS. 3 and 4, in one exemplary embodiment of a first UE, the device 300 includes a program code 312 stored in the memory 310. The CPU 308 could execute program code 312 to enable the first UE (i) to receive, from a network, a configuration of a sidelink resource pool in a carrier and/or a cell, wherein PSFCH resources of the sidelink resource pool are configured, periodically with a period of N slots, in slots of the sidelink resource pool, and wherein N is larger than 1, (ii) to receive, from the network, a configuration with a set of time offsets for determining an association set, wherein the association set comprises a set of slots of the sidelink resource pool, wherein the set of slots is earlier than a third slot (in which the first UE transmits a sidelink HARQ-ACK codebook), and wherein the set of slots is determined based upon the set of time offsets, (iii) to determine one or more first slots, wherein each slot of the one or more first slots is in the association set and each slot of the one or more first slots comprises PSFCH resources of the sidelink resource pool, and (iv) to generate the sidelink HARQ-ACK codebook based upon one or more first occasions, wherein the one or more first occasions is determined or derived based upon the one or more first slots and the period of N slots. Furthermore, the CPU 308 can execute the program code 312 to perform one, some and/or all of the above-described actions and steps and/or others described herein.

Figure 11:
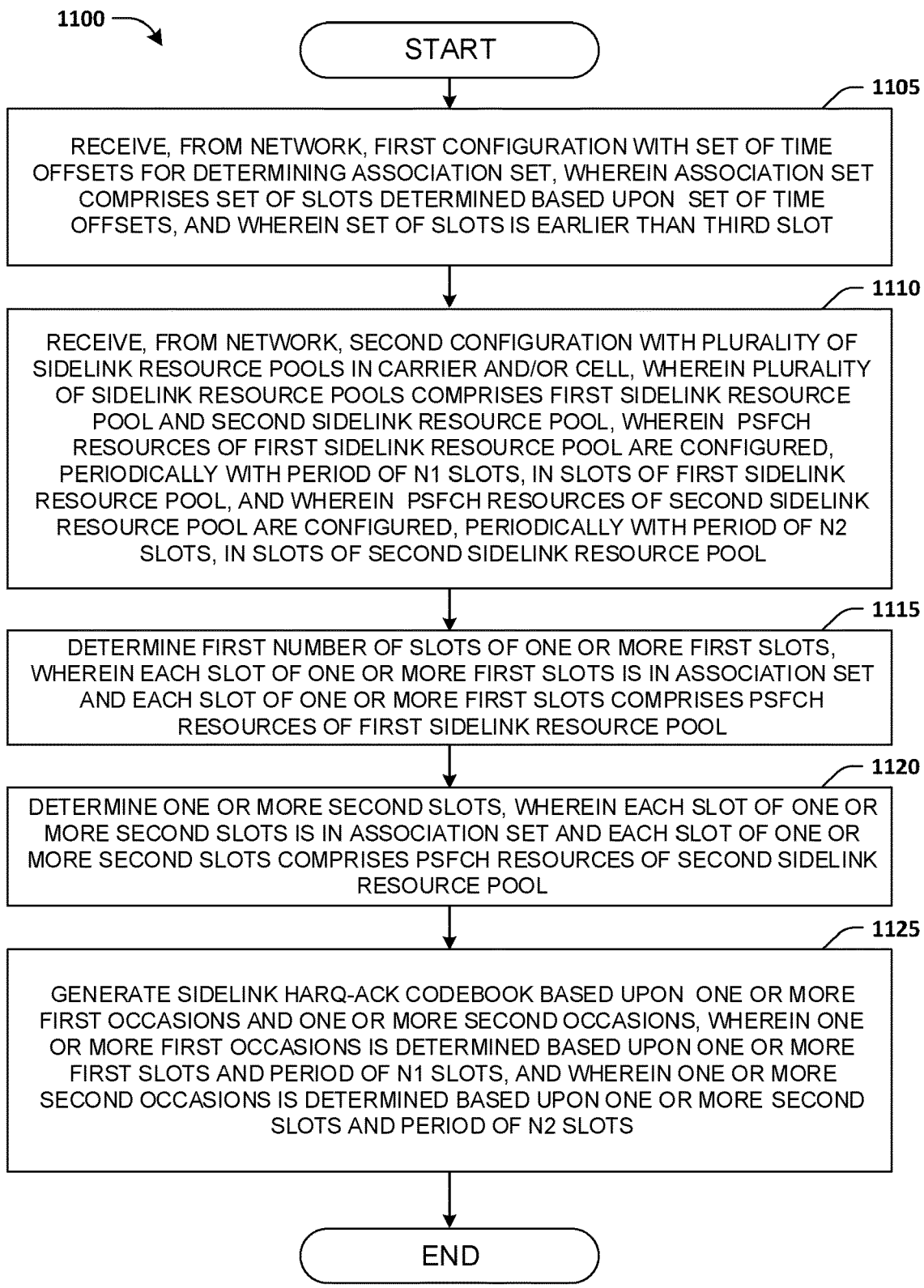
FIG. 11 is a flow chart according to one exemplary embodiment.

FIG. 11 is a flow chart 1100 according to one exemplary embodiment for transmitting a sidelink HARQ-ACK codebook to a network in a third slot (e.g., slot $n_u$) from the perspective of a first UE. In step 1105, the first UE receives, from the network, a first configuration with a set of time offsets for determining an association set. The association set comprises a set of slots determined (and/or derived) based upon the set of time offsets. The set of slots is earlier than (e.g., before) the third slot. In step 1110, the first UE receives, from the network, a second configuration with a plurality of sidelink resource pools in a carrier and/or a cell. The plurality of sidelink resource pools comprises a first sidelink resource pool and a second sidelink resource pool. PSFCH resources of the first sidelink resource pool are configured, periodically with a period of N1 slots, in slots of the first sidelink resource pool. In an example, each set of N1 slots, of the first sidelink resource pool, comprises one slot comprising a PSFCH resource of the first sidelink resource pool. PSFCH resources of the second sidelink resource pool are configured, periodically with a period of N2 slots, in slots of the second sidelink resource pool. In an example, each set of N2 slots, of the second sidelink resource pool, comprises one slot comprising a PSFCH resource of the second sidelink resource pool. In step 1115, the first UE determines (and/or derives) one or more first slots, wherein each slot of the one or more first slots is in the association set and each slot of the one or more first slots comprises PSFCH resources of the first sidelink resource pool. In an example, the one or more first slots corresponds to a number of slots that are in the association set and that comprise a PSFCH resource of the first sidelink resource pool. In step 1120, the first UE determines (and/or derives) one or more second slots, wherein each slot of the one or more second slots is in the association set and each slot of the one or more second slots comprises PSFCH resources of the second sidelink resource pool. In an example, the one or more second slots corresponds to a number of slots that are in the association set and that comprise a PSFCH resource of the second sidelink resource pool. In step 1125, the first UE generates the sidelink HARQ-ACK codebook based upon one or more first occasions and one or more second occasions. The one or more first occasions is determined (and/or derived) based upon the one or more first slots and the period of N1 slots. The one or more second occasions is determined (and/or derived) based upon the one or more second slots and the period of N2 slots.

In one embodiment, N1 is larger than or equal to 1, and/or N2 is larger than or equal to 1. In one embodiment, both the first sidelink resource pool and the second sidelink resource pool comprise slots with one or more PSFCH resources within the association set.

In one embodiment, the first sidelink resource pool and the second sidelink resource pool are separated in time domain. In one embodiment, each slot of the first sidelink resource pool is different from each slot in the second sidelink resource pool. In one embodiment, the first sidelink resource pool and the second sidelink resource pool do not overlap in time domain and do not overlap in frequency domain.

In one embodiment, the first sidelink resource pool and the second sidelink resource pool comprise a second slot, wherein one or more first frequency resources of the first sidelink resource pool in the second slot are different than one or more second frequency resources of the second sidelink resource pool in the second slot (e.g., for the second slot, the first sidelink resource pool is separated from the second sidelink resource pool). In one embodiment, the first sidelink resource pool and the second sidelink resource pool overlap (e.g., partially or fully overlap) in time domain in one or more slots, and do not overlap in frequency domain.

In one embodiment, the sidelink HARQ-ACK codebook comprises information (e.g., sidelink HARQ-ACK feedback information) associated with the one or more first occasions followed by information (e.g., sidelink HARQ-ACK feedback information) associated with the one or more second occasions.

In one embodiment, the first UE determines (and/or derives) an order of a plurality of occasions comprising the one or more first occasions and the one or more second occasions. The sidelink HARQ-ACK codebook is generated based upon the order of the plurality of occasions (e.g., indications of sidelink HARQ-ACK feedback may be arranged in the sidelink HARQ-ACK codebook in accordance with the order of the plurality of occasions). In one embodiment, the first UE determines (and/or derives) the order by ordering the plurality of occasions based upon slot indexes (and/or slot offsets) associated with the plurality of occasions to determine a second order of the plurality of occasions, followed by ordering the plurality of occasions based upon the second order of the plurality of occasions and the plurality of sidelink resource pools to determine the order of the plurality of occasions (e.g., the second order of the plurality of occasions may be re-ordered based upon the plurality of sidelink resource pools to determine the order of the plurality of occasions). Alternatively, the first UE determines (and/or derives) the order by ordering the plurality of occasions based upon the plurality of sidelink resource pools to determine a third order of the plurality of occasions, followed by ordering the plurality of occasions based upon the third order of the plurality of occasions and the slot indexes (and/or the slot offsets) associated with the plurality of occasions to determine the order of the plurality of occasions (e.g., the third order of the plurality of occasions may be re-ordered based upon the slot indexes (and/or the slot offsets) to determine the order of the plurality of occasions).

In one embodiment, a slot of the one or more first slots is counted as N1 occasions in determining or deriving the one or more first occasions (e.g., when determining or deriving the one or more first occasions, the first UE counts N1 occasions for one slot, in the association set, that comprises one or more PSFCH resources of the first sidelink resource pool). In one embodiment, a slot, in the association set, that does not comprise PSFCH resource of the first sidelink resource pool is not counted as any occasion (e.g., is counted as 0 occasions) in determining or deriving the one or more first occasions (e.g., when determining or deriving the one or more first occasions, the first UE does not count any occasion for a slot, in the association set, that does not comprise a PSFCH resource of the first sidelink resource pool). In one embodiment, a slot of the one or more second slots is counted as N2 occasions in determining or deriving the one or more second occasions (e.g., when determining or deriving the one or more second occasions, the first UE counts N2 occasions for one slot, in the association set, that comprises one or more PSFCH resources of the second sidelink resource pool). In one embodiment, a slot, in the association set, that does not comprise PSFCH resource of the second sidelink resource pool is not counted as any occasion (e.g., is counted as 0 occasions) in determining or deriving the one or more second occasions (e.g., when determining or deriving the one or more second occasions, the first UE does not count any occasion for a slot, in the association set, that does not comprise a PSFCH resource of the second sidelink resource pool).

In one embodiment, a first number of the one or more first occasions is determined (and/or derived) based upon a product of a first number of the one or more first slots and N1. In one embodiment, a second number of the one or more second occasions is determined (and/or derived) based upon a product of a second number of the one or more second slots and N2. In one embodiment, a first number of the one or more first occasions is equal to the product of a first number of the one or more first slots and N1. In one embodiment, a second number of the one or more second occasions is equal to the product of a second number of the one or more second slots and N2. In one embodiment, a size of the sidelink HARQ-ACK codebook corresponds to a sum of a plurality of numbers of occasions associated with the plurality of sidelink resource pools, wherein the plurality of numbers of occasions comprises the one or more first occasions and the one or more second occasions (e.g., the sum of the plurality of numbers of occasions may be equal to a number of bits of the sidelink HARQ-ACK codebook and/or the sum of the plurality of numbers of occasions may be equal to a number of sidelink HARQ-ACKs indicated by the sidelink HARQ-ACK codebook).

In one embodiment, in response to not receiving a PSFCH resource associated with a first occasion of the one or more first occasions, not receiving a DCI for scheduling a sidelink resource associated with the PSFCH resource and/or not performing a first sidelink data transmission associated with the first occasion, the first UE generates NACK for the first occasion. In an example, the sidelink HARQ-ACK codebook is indicative of NACK for the first occasion. In one embodiment, in response to not receiving a PSFCH resource associated with a second occasion of the one or more second occasions, not receiving a DCI for scheduling a sidelink resource associated with the PSFCH resource, and/or not performing a second sidelink data transmission associated with the second occasion, the first UE generates NACK for the second occasion. In an example, the sidelink HARQ-ACK codebook is indicative of NACK for the second occasion.

In one embodiment, the first UE receives a first DCI for scheduling one or more first sidelink resources in the first sidelink resource pool. In an example, the first DCI may or may not be for scheduling one or more other resources in addition to the one or more first sidelink resource in the first resource pool. The first UE receives a second DCI for scheduling one or more second sidelink resources in the second sidelink resource pool. In an example, the second DCI may or may not be for scheduling one or more other resources in addition to the one or more second sidelink resource in the second resource pool. In one embodiment, the first DCI and the second DCI indicate the third slot for transmission of the sidelink HARQ-ACK codebook, wherein the sidelink HARQ-ACK codebook comprises sidelink HARQ-ACK feedback associated with a first sidelink data transmission transmitted by the first UE on a first sidelink resource of the one or more first sidelink resources, and a second sidelink data transmission transmitted by the first UE on a second sidelink resource of the one or more second sidelink resources. For example, the sidelink HARQ-ACK feedback may indicate whether or not the first sidelink data transmission and/or the second sidelink data transmission are successfully received by one or more devices.

Referring back to FIGS. 3 and 4, in one exemplary embodiment of a first UE, the device 300 includes a program code 312 stored in the memory 310. The CPU 308 could execute program code 312 to enable the first UE (i) to receive, from a network, a first configuration with a set of time offsets for determining an association set, wherein the association set comprises a set of slots determined based upon the set of time offsets, and wherein the set of slots is earlier than a third slot (in which the first UE transmits a sidelink HARQ-ACK codebook), (ii) to receive, from the network, a second configuration with a plurality of sidelink resource pools in a carrier and/or a cell, wherein the plurality of sidelink resource pools comprises a first sidelink resource pool and a second sidelink resource pool, wherein PSFCH resources of the first sidelink resource pool are configured, periodically with a period of N1 slots, in slots of the first sidelink resource pool, and wherein PSFCH resources of the second sidelink resource pool are configured, periodically with a period of N2 slots, in slots of the second sidelink resource pool, (iii) to determine one or more first slots, wherein each slot of the one or more first slots is in the association set and each slot of the one or more first slots comprises PSFCH resources of the first sidelink resource pool, (iv) to determine one or more second slots, wherein each slot of the one or more second slots is in the association set and each slot of the one or more second slots comprises PSFCH resources of the second sidelink resource pool, and (v) to generate the sidelink HARQ-ACK codebook based upon one or more first occasions and one or more second occasions, wherein the one or more first occasions is determined or derived based upon the one or more first slots and the period of N1 slots, and wherein the one or more second occasions is determined or derived based upon the one or more second slots and the period of N2 slots. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 9-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 9-11, and/or one, some and/or all of the above-described actions and steps and/or others described herein.

It may be appreciated that applying one or more of the techniques presented herein may result in one or more benefits including, but not limited to, increased efficiency of communication between devices (e.g., at least one of one or more UEs, one or more V2X devices, one or more network nodes, etc.), such as a result of enabling a device to determine a size of a sidelink HARQ-ACK codebook for transmission to a network node.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a first User Equipment (UE) for transmitting a sidelink Hybrid Automatic Repeat Request acknowledgement (HARQ-ACK) codebook to a network on a Physical Uplink Control Channel (PUCCH) resource or a Physical Uplink Shared Channel (PUSCH) resource in a third slot, the method comprising:

receiving, from the network, a configuration of a sidelink resource pool in at least one of a carrier or a cell, wherein:
  Physical Sidelink Feedback Channel (PSFCH) resources of the sidelink resource pool are configured, periodically with a period of N slots, in slots of the sidelink resource pool; and
  N is larger than 1;
receiving, from the network, a configuration with a set of time offsets for determining an association set, wherein:
  the association set comprises a set of slots of the sidelink resource pool;
  the set of slots is earlier than the third slot; and
  the set of slots is determined based upon the set of time offsets;
receiving a Downlink Control Information (DCI) for scheduling one or more sidelink resources in the sidelink resource pool, wherein the DCI indicates the third slot for transmission, to the network, of sidelink HARQ-ACK feedback information associated with a sidelink data transmission on a sidelink resource of the one or more sidelink resources;
performing the sidelink data transmission on the sidelink resource to a second UE;
at least one of monitoring or receiving a sidelink HARQ-ACK feedback, via a first PSFCH resource in a slot in the association set, from the second UE in response to the sidelink data transmission;
determining one or more first slots, wherein each slot of the one or more first slots is in the association set and each slot of the one or more first slots comprises at least one of the PSFCH resources of the sidelink resource pool; and
generating the sidelink HARQ-ACK codebook based upon one or more first occasions, wherein the one or more first occasions is determined or derived based upon the one or more first slots and the period of N slots and the sidelink HARQ-ACK feedback information is on an occasion, of the one or more first occasions, associated with the first PSFCH resource.

2. The method of claim 1, wherein at least one of:
a slot of the one or more first slots is counted as N occasions in determining or deriving the one or more first occasions; or
a slot, in the association set, that does not comprise PSFCH resource of the sidelink resource pool is not counted as any occasion in determining or deriving the one or more first occasions.

3. The method of claim 1, wherein at least one of:
a first number of the one or more first occasions is determined or derived based upon a product of a first number of the one or more first slots and N;
a first number of the one or more first occasions is equal to the product of a first number of the one or more first slots and N;
a size of the sidelink HARQ-ACK codebook corresponds to a first number of the one or more first occasions; or
the size of the sidelink HARQ-ACK codebook corresponds to the product of a first number of the one or more first slots and N.

4. The method of claim 1, wherein at least one of:
PSFCH resources in a fourth slot of the one or more first slots are associated with sidelink resources for sidelink data transmissions in a plurality of slots of the sidelink resource pool, wherein a number of slots of the plurality of slots is equal to N and each slot of the plurality of slots comprises sidelink resources for sidelink data transmission;

an association between the fourth slot of the one or more first slots and the plurality of slots is at least one of configured or specified for the sidelink resource pool; or the fourth slot of the one or more first slots comprises a set of PSFCH resources, wherein the set of PSFCH resources comprises N subsets of PSFCH resources, wherein at least one of:

each subset of PSFCH resources of the N subsets of PSFCH resources is utilized for transmission of sidelink HARQ-ACK feedback associated with a sidelink data transmission in a slot of the plurality of slots;

an occasion of the one or more first occasions is associated with a subset of PSFCH resources of the sidelink resource pool; or an occasion of the one or more first occasions is associated with sidelink HARQ-ACK feedback information associated with a sidelink data transmission in a slot of the plurality of slots.

5. The method of claim 1, comprising:
determining or deriving an order of the one or more first occasions, wherein at least one of:
the generating the sidelink HARQ-ACK codebook is performed based upon the order of the one or more first occasions;
the one or more first occasions comprise a plurality of sets of occasions;
each set of occasions of the plurality of sets of occasions is associated with a set of PSFCH resources in a slot of the one or more first slots;
the order of the one or more first occasions corresponds to a first set of occasions of the plurality of sets of occasions being followed by a second set of occasions of the plurality of sets of occasions;
the first set of occasions is associated with a first set of PSFCH resources in an earliest slot of the one or more first slots;
the first set of PSFCH resources comprises N first subsets of PSFCH resources, and an occasion of the first set of occasions is associated with a first subset of PSFCH resources;
the second set of occasions is associated with a second set of PSFCH resources in a slot, of the one or more first slots, after the earliest slot of the one or more first slots;
the second set of PSFCH resources comprises N second subsets of PSFCH resources, and an occasion of the second set of occasions is associated with a second subset of PSFCH resources; or
for each set of occasions of the plurality of sets of occasions, the order of the one or more first occasions corresponds to a first occasion, of the set of occasions, associated with a second slot for sidelink data transmission being followed by a second occasion, of the set of occasions, associated with a third slot for sidelink data transmission that is after the second slot.

6. The method of claim 1, comprising:
receiving one or more sets of PSFCH resources in a slot of the one or more first slots, wherein PSFCH resources, of a set of PSFCH resources of the one or more sets of PSFCH resources, overlap in time domain and do not overlap in frequency domain.

7. The method of claim 4, wherein at least one of:
if a sidelink data transmission in a slot of the plurality of slots is unicast, a number of PSFCH resources of a subset of PSFCH resources associated with the sidelink data transmission is one; or
if a sidelink data transmission in a slot of the plurality of slots is groupcast, a number of PSFCH resources of a subset of PSFCH resources associated with the sidelink data transmission is at least one.

8. The method of claim 1, comprising:
responsive to at least one of not receiving a subset of PSFCH resources associated with an occasion of the one or more first occasions, not receiving a DCI for scheduling a sidelink resource associated with the subset of PSFCH resources, or not performing a sidelink data transmission associated with the occasion of the one or more first occasions, generating Negative Acknowledgment (NACK) for the occasion, wherein the sidelink HARQ-ACK codebook is indicative of NACK for the occasion.

9. The method of claim 1, comprising:
determining to perform a PSFCH transmission and not to perform a PSFCH reception in a fourth slot of the one or more first slots; wherein:
the fourth slot of the one or more first slots is counted in determining or deriving the one or more first occasions; and
the fourth slot of the one or more first slots is counted as N occasions in determining or deriving the one or more first occasions.

10. A method of a first User Equipment (UE) for transmitting a sidelink Hybrid Automatic Repeat Request acknowledgement (HARQ-ACK) codebook to a network in a third slot, the method comprising:
receiving, from the network, a first configuration with a set of time offsets for determining an association set, wherein:
the association set comprises a set of slots determined based upon the set of time offsets; and
the set of slots is earlier than the third slot;
receiving, from the network, a second configuration with a plurality of sidelink resource pools in at least one of a carrier or a cell, wherein:
the plurality of sidelink resource pools comprises a first sidelink resource pool and a second sidelink resource pool;
Physical Sidelink Feedback Channel (PSFCH) resources of the first sidelink resource pool are configured, periodically with a period of N1 slots, in slots of the first sidelink resource pool; and
PSFCH resources of the second sidelink resource pool are configured, periodically with a period of N2 slots, in slots of the second sidelink resource pool;
determining one or more first slots, wherein each slot of the one or more first slots is in the association set and each slot of the one or more first slots comprises at least one of the PSFCH resources of the first sidelink resource pool;
determining one or more second slots, wherein each slot of the one or more second slots is in the association set and each slot of the one or more second slots comprises at least one of the PSFCH resources of the second sidelink resource pool; and
generating the sidelink HARQ-ACK codebook based upon one or more first occasions and one or more second occasions, wherein:

the one or more first occasions is determined or derived based upon the one or more first slots and the period of N1 slots; and the one or more second occasions is determined or derived based upon the one or more second slots and the period of N2 slots.

11. The method of claim 10, wherein at least one of:
N1 is larger than or equal to 1; or
N2 is larger than or equal to 1.

12. The method of claim 10, wherein at least one of:
the first sidelink resource pool and the second sidelink resource pool are separated in time domain;
each slot of the first sidelink resource pool is different from each slot in the second sidelink resource pool; or
the first sidelink resource pool and the second sidelink resource pool do not overlap in time domain and do not overlap in frequency domain.

13. The method of claim 10, wherein at least one of:
the first sidelink resource pool and the second sidelink resource pool comprise a second slot, wherein one or more first frequency resources of the first sidelink resource pool in the second slot are different than one or more second frequency resources of the second sidelink resource pool in the second slot; or
the first sidelink resource pool and the second sidelink resource pool overlap in time domain in one or more slots, and do not overlap in frequency domain.

14. The method of claim 10, wherein:
the sidelink HARQ-ACK codebook comprises information associated with the one or more first occasions followed by information associated with the one or more second occasions.

15. The method of claim 10, comprising:
determining or deriving an order of a plurality of occasions comprising the one or more first occasions and the one or more second occasions, wherein:
the generating the sidelink HARQ-ACK codebook is performed based upon the order of the plurality of occasions; and
the determining the order comprises one of:
ordering the plurality of occasions based upon slot indexes associated with the plurality of occasions to determine a second order of the plurality of occasions, followed by ordering the plurality of occasions based upon the second order of the plurality of occasions and the plurality of sidelink resource pools to determine the order of the plurality of occasions; or
ordering the plurality of occasions based upon the plurality of sidelink resource pools to determine a third order of the plurality of occasions, followed by ordering the plurality of occasions based upon the third order of the plurality of occasions and the slot indexes associated with the plurality of occasions to determine the order of the plurality of occasions.

16. The method of claim 10, wherein at least one of:
a slot of the one or more first slots is counted as N1 occasions in determining or deriving the one or more first occasions;
a slot, in the association set, that does not comprise PSFCH resource of the first sidelink resource pool is not counted as any occasion in determining or deriving the one or more first occasions;
a slot of the one or more second slots is counted as N2 occasions in determining or deriving the one or more second occasions; or
a slot, in the association set, that does not comprise PSFCH resource of the second sidelink resource pool is not counted as any occasion in determining or deriving the one or more second occasions.

17. The method of claim 10, wherein at least one of:
a first number of the one or more first occasions is determined or derived based upon a product of a first number of the one or more first slots and N1;
a second number of the one or more second occasions is determined or derived based upon a product of a second number of one or more second slots and N2;
a first number of the one or more first occasions is equal to the product of a first number of the one or more first slots and N1;
a second number of the one or more second occasions is equal to the product of a second number of the one or more second slots and N2; or
a size of the sidelink HARQ-ACK codebook corresponds to a sum of a plurality of numbers of occasions associated with the plurality of sidelink resource pools, wherein the plurality of numbers of occasions comprises the one or more first occasions and the one or more second occasions.

18. The method of claim 10, comprising at least one of:
responsive to at least one of not receiving a PSFCH resource associated with a first occasion of the one or more first occasions, not receiving a Downlink Control Information (DCI) for scheduling a sidelink resource associated with the PSFCH resource, or not performing a first sidelink data transmission associated with the first occasion, generating Negative Acknowledgment (NACK) for the first occasion, wherein the sidelink HARQ-ACK codebook is indicative of NACK for the first occasion; or
responsive to at least one of not receiving a PSFCH resource associated with a second occasion of the one or more second occasions, not receiving a DCI for scheduling a sidelink resource associated with the PSFCH resource, or not performing a second sidelink data transmission associated with the second occasion, generating NACK for the second occasion, wherein the sidelink HARQ-ACK codebook is indicative of NACK for the second occasion.

19. The method of claim 10, wherein at least one of:
the method comprises:
receiving a first Downlink Control Information (DCI) for scheduling one or more first sidelink resources in the first sidelink resource pool; and
receiving a second DCI for scheduling one or more second sidelink resources in the second sidelink resource pool; or
the first DCI and the second DCI indicate the third slot for transmission of the sidelink HARQ-ACK codebook, wherein the sidelink HARQ-ACK codebook comprises sidelink HARQ-ACK feedback information associated with:
a first sidelink data transmission transmitted by the first UE on a first sidelink resource of the one or more first sidelink resources; and
a second sidelink data transmission transmitted by the first UE on a second sidelink resource of the one or more second sidelink resources.

20. A method of a first User Equipment (UE) for transmitting a sidelink Hybrid Automatic Repeat Request acknowledgement (HARQ-ACK) codebook to a network in a third slot, the method comprising:

receiving, from the network, a configuration of a sidelink resource pool in at least one of a carrier or a cell, wherein:
- Physical Sidelink Feedback Channel (PSFCH) resources of the sidelink resource pool are configured, periodically with a period of N slots, in slots of the sidelink resource pool; and
- N is larger than 1;

receiving, from the network, a configuration with a set of time offsets for determining an association set, wherein:
- the association set comprises a set of slots of the sidelink resource pool;
- the set of slots is earlier than the third slot; and
- the set of slots is determined based upon the set of time offsets;

determining one or more first slots, wherein each slot of the one or more first slots is in the association set and each slot of the one or more first slots comprises at least one of the PSFCH resources of the sidelink resource pool; and generating the sidelink HARQ-ACK codebook based upon one or more first occasions and an order of the one or more first occasions, wherein the one or more first occasions is determined or derived based upon the one or more first slots and the period of N slots, and wherein:
- the one or more first occasions comprise a plurality of sets of occasions;
- the order of the one or more first occasions corresponds to a first set of occasions of the plurality of sets of occasions being followed by a second set of occasions of the plurality of sets of occasions;
- the first set of occasions is associated with a first set of PSFCH resources in an earliest slot of the one or more first slots; and
- the second set of occasions is associated with a second set of PSFCH resources in a slot, of the one or more first slots, after the earliest slot of the one or more first slots.

* * * * *